US010739798B2

(12) United States Patent
Charr et al.

(10) Patent No.: US 10,739,798 B2
(45) Date of Patent: Aug. 11, 2020

(54) INCIPIENT TEMPERATURE EXCURSION MITIGATION AND CONTROL

(71) Applicant: UOP LLC, Des Plaines, IL (US)

(72) Inventors: Jorge Charr, Northbrook, IL (US); Donald Eizenga, Elk Grove Village, IL (US); Raul A. Ohaco, Glenview, IL (US); Ralph P. Davis, Schaumburg, IL (US); Christina L. Haasser, Palatine, IL (US); James W. Harris, Palatine, IL (US); Kevin Carnes, Elk Grove Village, IL (US); Daliah Papoutsis, Glenview, IL (US)

(73) Assignee: UOP LLC, Des Plaines, IL (US)

( * ) Notice: Subject to any disclaimer, the term of this patent is extended or adjusted under 35 U.S.C. 154(b) by 158 days.

(21) Appl. No.: 15/972,974

(22) Filed: May 7, 2018

(65) Prior Publication Data

US 2018/0364747 A1   Dec. 20, 2018

Related U.S. Application Data

(60) Provisional application No. 62/522,612, filed on Jun. 20, 2017.

(51) Int. Cl.
  *C10G 45/72* (2006.01)
  *C10G 47/36* (2006.01)
  (Continued)

(52) U.S. Cl.
  CPC .......... *G05D 23/1934* (2013.01); *B01J 8/001* (2013.01); *B01J 19/002* (2013.01);
  (Continued)

(58) Field of Classification Search
  CPC ............ G05B 23/0237; G05B 23/0221; G05B 23/0283; G05B 2219/32128;
  (Continued)

(56) References Cited

U.S. PATENT DOCUMENTS

| 4,159,239 A | 6/1979 | Schwartz | 208/113 |
| 4,267,458 A | 5/1981 | Uram | 290/40 R |

(Continued)

FOREIGN PATENT DOCUMENTS

| EP | 0181744 A1 | 5/1986 | B65G 53/66 |
| EP | 2746884 A1 | 6/2014 | G05B 23/02 |

(Continued)

OTHER PUBLICATIONS

Oct. 4, 2018—PCT/U.S. Notification of Receipt of Search Copy—App 2018/038286.

(Continued)

*Primary Examiner* — Michael J Brown

(57) ABSTRACT

Systems and methods are disclosed for detecting temperature excursion in a chemical plant or petrochemical plant or refinery. Aspects of the disclosure provide an enhanced control system for a reactor, such as in hydroprocessing. The enhanced control system may provide early warnings of impending undesirable events, directly or indirectly manipulate certain process variables to reduce undesirable outcomes, and/or directly or indirectly manipulate of certain process variables so as to place a reactor unit in a "safe park" state. This may avoid a high temperature trip, depressuration, associated operating risks, allow for faster recovery from temperature excursions, and/or avoid unplanned emergency shutdowns of the reactor, chemical process, plant, or refinery.

16 Claims, 20 Drawing Sheets

(51) Int. Cl.

| | | |
|---|---|---|
| *G05D 23/19* | (2006.01) | |
| *B01J 19/00* | (2006.01) | |
| *B01J 8/00* | (2006.01) | |
| *G05B 23/02* | (2006.01) | |
| *G06F 16/21* | (2019.01) | |
| *G06F 11/07* | (2006.01) | |
| *G05D 7/00* | (2006.01) | |

(52) U.S. Cl.
CPC ....... *B01J 19/0013* (2013.01); *B01J 19/0033* (2013.01); *C10G 45/72* (2013.01); *C10G 47/36* (2013.01); *B01J 2208/0007* (2013.01); *B01J 2208/00017* (2013.01); *B01J 2208/00044* (2013.01); *B01J 2208/00061* (2013.01); *B01J 2208/00088* (2013.01); *B01J 2208/00168* (2013.01); *B01J 2208/00327* (2013.01); *B01J 2219/00259* (2013.01); *B01J 2219/00261* (2013.01); *B01J 2219/00263* (2013.01); *B01J 2219/00268* (2013.01)

(58) Field of Classification Search
CPC ........ G05B 2219/32371; G05B 23/024; G05B 23/0264; G05B 23/0272; G06F 16/901; G06F 11/3476; G06F 11/0766; G06F 11/3089; G06F 16/219; G05D 23/1934; G05D 7/00; C10G 45/72; C10G 47/36
USPC ......................................................... 700/153
See application file for complete search history.

(56) References Cited

U.S. PATENT DOCUMENTS

| | | | |
|---|---|---|---|
| 4,284,494 A | 8/1981 | Bartholic | 208/164 |
| 4,362,614 A | 12/1982 | Asdigian | 208/235 |
| 4,380,146 A | 4/1983 | Yannone | 60/39.281 |
| 4,385,985 A | 5/1983 | Gross | 208/113 |
| 4,411,773 A | 10/1983 | Gross | 208/159 |
| 4,709,546 A | 12/1987 | Weiler | 415/116 |
| 4,775,460 A | 10/1988 | Reno | |
| 4,795,545 A | 1/1989 | Schmidt | |
| 4,902,469 A | 2/1990 | Watson | 376/216 |
| 5,077,252 A | 12/1991 | Owen et al. | 502/43 |
| 5,227,121 A | 7/1993 | Scarola | 340/525 |
| 5,582,684 A | 12/1996 | Holmqvist et al. | 162/49 |
| 5,605,435 A | 2/1997 | Haugen | 137/514 |
| 5,616,214 A | 4/1997 | Leclerc | 162/49 |
| 5,642,296 A | 6/1997 | Saxena | 216/84 |
| 5,666,297 A | 9/1997 | Britt et al. | 364/578 |
| 5,817,517 A | 10/1998 | Perry et al. | 436/55 |
| 6,038,540 A | 3/2000 | Krist et al. | 705/8 |
| 6,081,230 A | 6/2000 | Hoshino | 342/357.32 |
| 6,230,486 B1 | 5/2001 | Yasui | 123/674 |
| 6,266,605 B1 | 7/2001 | Yasui | 60/276 |
| 6,271,845 B1 | 8/2001 | Richardson | 715/764 |
| 6,392,114 B1 | 5/2002 | Shields et al. | 582/719 |
| 6,760,716 B1 | 7/2004 | Ganesamoorthi et al. | 706/21 |
| 6,772,044 B1 | 8/2004 | Mathur et al. | 700/204 |
| 6,795,798 B2 | 9/2004 | Eryurek et al. | 702/188 |
| 6,982,032 B2 | 1/2006 | Shaffer et al. | 210/101 |
| 6,983,227 B1 | 1/2006 | Thalhammer-Reyero | |
| 7,006,889 B2 | 2/2006 | Mathur et al. | 700/204 |
| 7,067,333 B1 | 6/2006 | Pasadyn et al. | 438/5 |
| 7,133,807 B2 | 11/2006 | Karasawa | 702/188 |
| 7,151,966 B1 | 12/2006 | Baier et al. | 700/19 |
| 7,246,039 B2 | 7/2007 | Moorhouse | 702/185 |
| 7,313,447 B2 | 12/2007 | Hsuing et al. | 700/9 |
| 7,415,357 B1 | 8/2008 | Stluka et al. | 702/6 |
| 7,567,887 B2 | 7/2009 | Emigholz et al. | 702/182 |
| 7,742,833 B1 | 6/2010 | Herbst et al. | 700/108 |
| 7,836,941 B2 | 11/2010 | Song et al. | |
| 7,877,596 B2 | 1/2011 | Foo Kune et al. | 713/153 |
| 7,925,979 B2 | 4/2011 | Forney et al. | 715/733 |
| 7,936,878 B2 | 5/2011 | Kune et al. | 380/270 |
| 7,979,192 B2 | 7/2011 | Morrison et al. | |
| 7,995,526 B2 | 8/2011 | Liu et al. | 370/329 |
| 8,050,889 B2 | 11/2011 | Fluegge et al. | 702/182 |
| 8,055,371 B2 | 11/2011 | Sanford et al. | 700/108 |
| 8,111,619 B2 | 2/2012 | Liu et al. | 370/229 |
| 8,128,808 B2 | 3/2012 | Hassan et al. | 208/209 |
| 8,204,717 B2 | 6/2012 | McLaughlin et al. | 702/188 |
| 8,244,384 B2 | 8/2012 | Pachner et al. | 700/30 |
| 8,280,057 B2 | 10/2012 | Budampati et al. | 380/270 |
| 8,352,049 B2 | 1/2013 | Hsiung et al. | |
| 8,354,081 B2 | 1/2013 | Wheat et al. | |
| 8,385,436 B2 | 2/2013 | Holm et al. | 375/260 |
| 8,428,067 B2 | 4/2013 | Budampati et al. | 370/395.21 |
| 8,458,778 B2 | 6/2013 | Budampati et al. | 726/6 |
| 8,571,064 B2 | 10/2013 | Kore et al. | 370/469 |
| 8,630,962 B2 | 1/2014 | Maeda | 706/12 |
| 8,644,192 B2 | 2/2014 | Budampati et al. | 370/255 |
| 8,811,231 B2 | 8/2014 | Budampati et al. | 370/255 |
| 8,815,152 B2 | 8/2014 | Burgess et al. | |
| 8,923,882 B2 | 12/2014 | Gandhi et al. | 455/455 |
| 8,926,737 B2 | 1/2015 | Chatterjee et al. | |
| 9,053,260 B2 | 6/2015 | Romatier et al. | |
| 9,134,717 B2 | 9/2015 | Trnka | |
| 9,166,667 B2 | 10/2015 | Thanikachalam | |
| 9,176,498 B2 | 11/2015 | Baramov | |
| 9,354,631 B2 | 5/2016 | Mohideen et al. | |
| 9,580,341 B1 | 2/2017 | Brown et al. | C02F 3/006 |
| 9,751,817 B2 | 9/2017 | Jani et al. | |
| 9,864,823 B2 | 1/2018 | Horn et al. | |
| 9,968,899 B1 | 5/2018 | Gellaboina et al. | |
| 10,095,200 B2 | 10/2018 | Horn et al. | |
| 10,107,295 B1 | 10/2018 | Brecheisen | |
| 10,180,680 B2 | 1/2019 | Horn et al. | |
| 10,183,266 B2 | 1/2019 | Victor et al. | |
| 10,222,787 B2 | 3/2019 | Romatier et al. | |
| 10,328,408 B2 | 6/2019 | Victor et al. | |
| 2002/0123864 A1 | 9/2002 | Eryurek et al. | 702/188 |
| 2002/0179495 A1 | 12/2002 | Heyse et al. | 208/137 |
| 2003/0036052 A1 | 2/2003 | Delwiche et al. | 435/4 |
| 2003/0105775 A1 | 6/2003 | Shimada | |
| 2003/0147351 A1 | 8/2003 | Greenlee | 370/232 |
| 2003/0223918 A1 | 12/2003 | Cammy | 422/144 |
| 2004/0079392 A1 | 4/2004 | Kuechler | 134/22.19 |
| 2004/0099572 A1 | 5/2004 | Evans | 208/113 |
| 2004/0109788 A1 | 6/2004 | Li et al. | 422/3 |
| 2004/0122273 A1 | 6/2004 | Kabin | 585/639 |
| 2004/0122936 A1 | 6/2004 | Mizelle et al. | |
| 2004/0147036 A1 | 7/2004 | Krenn et al. | 436/119 |
| 2004/0148144 A1 | 7/2004 | Martin | |
| 2004/0204775 A1 | 10/2004 | Keyes et al. | 705/30 |
| 2004/0204913 A1 | 10/2004 | Mueller et al. | |
| 2004/0220689 A1 | 11/2004 | Mathur et al. | 700/97 |
| 2004/0220778 A1 | 11/2004 | Imai et al. | 702/188 |
| 2005/0027721 A1 | 2/2005 | Saenz | 707/100 |
| 2005/0029163 A1 | 2/2005 | Letzsch | 208/113 |
| 2005/0098033 A1 | 5/2005 | Mallavarapu et al. | 95/96 |
| 2005/0133211 A1 | 6/2005 | Osborn et al. | |
| 2005/0216209 A1 | 9/2005 | Evans | 702/45 |
| 2006/0020423 A1 | 1/2006 | Sharpe, Jr. | 702/183 |
| 2006/0133412 A1 | 6/2006 | Callaghan | 370/465 |
| 2006/0252642 A1 | 11/2006 | Kanazirev | |
| 2006/0259163 A1 | 11/2006 | Hsiung et al. | 700/30 |
| 2007/0020154 A1 | 1/2007 | Evans | 422/139 |
| 2007/0059159 A1 | 3/2007 | Hjerpe | 415/117 |
| 2007/0059838 A1 | 3/2007 | Morrison et al. | 436/55 |
| 2007/0091824 A1 | 4/2007 | Budampati et al. | 370/255 |
| 2007/0091825 A1 | 4/2007 | Budampati et al. | 370/255 |
| 2007/0185664 A1 | 8/2007 | Tanaka | 702/56 |
| 2007/0192078 A1 | 8/2007 | Nasle et al. | 703/14 |
| 2007/0212790 A1 | 9/2007 | Welch et al. | 436/139 |
| 2007/0250292 A1 | 10/2007 | Alagappan et al. | 702/184 |
| 2007/0260656 A1 | 11/2007 | Wiig | |
| 2007/0271452 A1 | 11/2007 | Foo Kune et al. | 713/150 |
| 2008/0086322 A1 | 4/2008 | Wallace | 705/1 |
| 2008/0130902 A1 | 6/2008 | Foo Kune et al. | 380/286 |
| 2008/0154434 A1 | 6/2008 | Galloway et al. | |
| 2008/0217005 A1 | 9/2008 | Stluka et al. | 166/250.01 |
| 2008/0282606 A1 | 11/2008 | Plaza et al. | |
| 2009/0059786 A1 | 3/2009 | Budampati et al. | 370/230 |

(56) References Cited

U.S. PATENT DOCUMENTS

| | | |
|---|---|---|
| 2009/0060192 A1 | 3/2009 | Budampati et al. ............ 380/270 |
| 2009/0064295 A1 | 3/2009 | Budampati et al. .............. 726/6 |
| 2009/0201899 A1 | 8/2009 | Liu et al. ........................ 370/338 |
| 2009/0204245 A1 | 8/2009 | Sustaeta ............................ 700/99 |
| 2009/0245286 A1 | 10/2009 | Kore et al. ...................... 370/475 |
| 2009/0268674 A1 | 10/2009 | Liu et al. ........................ 370/329 |
| 2009/0281677 A1 | 11/2009 | Botich ............................. 700/295 |
| 2010/0014599 A1 | 1/2010 | Holm et al. ..................... 375/260 |
| 2010/0108567 A1 | 5/2010 | Medoff ............................... 208/49 |
| 2010/0125347 A1 | 5/2010 | Martin et al. ..................... 700/31 |
| 2010/0152900 A1 | 6/2010 | Gurciullo et al. |
| 2010/0158764 A1 | 6/2010 | Hedrick ........................... 422/134 |
| 2010/0230324 A1 | 9/2010 | Al-Alloush et al. ............. 208/82 |
| 2010/0262900 A1 | 10/2010 | Romatier et al. .............. 715/219 |
| 2011/0112659 A1 | 5/2011 | Pachner et al. ................... 700/29 |
| 2011/0152590 A1 | 6/2011 | Sadler et al. .................... 585/313 |
| 2011/0152591 A1 | 6/2011 | Sadler et al. .................... 585/313 |
| 2011/0311014 A1 | 12/2011 | Hottovy et al. ................. 376/283 |
| 2012/0029966 A1 | 2/2012 | Cheewakriengkrai et al. ............ 705/7.25 |
| 2012/0083933 A1 | 4/2012 | Subbu et al. .................... 700/291 |
| 2012/0095808 A1 | 4/2012 | Kattapuram et al. ......... 705/7.37 |
| 2012/0104295 A1 | 5/2012 | Do et al. ..................... 251/129.01 |
| 2012/0121376 A1 | 5/2012 | Huis in Het Veld ............. 415/1 |
| 2012/0123583 A1 | 5/2012 | Hazen et al. |
| 2012/0197616 A1 | 8/2012 | Trnka ................................ 703/6 |
| 2012/0259583 A1 | 10/2012 | Noboa et al. |
| 2013/0029587 A1 | 1/2013 | Gandhi et al. ...................... 455/7 |
| 2013/0031960 A1 | 2/2013 | Delrahim ................... 73/40.5 R |
| 2013/0079899 A1 | 3/2013 | Baramov .......................... 700/32 |
| 2013/0090088 A1 | 4/2013 | Chevsky et al. ............... 455/411 |
| 2013/0094422 A1 | 4/2013 | Thanikachalam ............ 370/312 |
| 2013/0172643 A1 | 7/2013 | Pradeep ......................... 585/310 |
| 2013/0253898 A1 | 9/2013 | Meagher et al. ................ 703/18 |
| 2013/0270157 A1 | 10/2013 | Ferrara .................... 208/48 AA |
| 2013/0311437 A1 | 11/2013 | Stluka et al. .................. 707/706 |
| 2013/0327052 A1 | 12/2013 | O'Neill ............................ 60/772 |
| 2014/0008035 A1 | 1/2014 | Patankar et al. |
| 2014/0026598 A1 | 1/2014 | Trawicki ............................ 62/56 |
| 2014/0074273 A1 | 3/2014 | Mohideen et al. ............. 700/98 |
| 2014/0114039 A1 | 4/2014 | Benham et al. ............. 526/348.5 |
| 2014/0131027 A1 | 5/2014 | Chir ................................. 165/300 |
| 2014/0163275 A1 | 6/2014 | Yanagawa et al. ........... 585/319 |
| 2014/0179968 A1 | 6/2014 | Yanagawa et al. ........... 585/476 |
| 2014/0212978 A1 | 7/2014 | Sharpe, Jr. et al. ............... 436/6 |
| 2014/0262949 A1* | 9/2014 | Kem .................. G05D 23/1932 208/107 |
| 2014/0294683 A1 | 10/2014 | Siedler .......................... 422/129 |
| 2014/0294684 A1 | 10/2014 | Siedler .......................... 422/129 |
| 2014/0296058 A1 | 10/2014 | Sechrist et al. ................. 502/53 |
| 2014/0309756 A1 | 10/2014 | Trygstad ........................... 700/31 |
| 2014/0337256 A1 | 11/2014 | Varadi et al. .................... 706/12 |
| 2014/0337277 A1 | 11/2014 | Asenjo et al. |
| 2015/0059714 A1 | 3/2015 | Bernards ................. 123/568.11 |
| 2015/0060331 A1 | 3/2015 | Sechrist et al. |
| 2015/0077263 A1 | 3/2015 | Ali et al. ........................ 340/679 |
| 2015/0078970 A1 | 3/2015 | Iddir et al. ..................... 422/218 |
| 2015/0098862 A1 | 4/2015 | Lok et al. ......................... 422/49 |
| 2015/0158789 A1 | 6/2015 | Keusenkothen ................ 60/780 |
| 2015/0185716 A1 | 7/2015 | Wichmann et al. .......... 700/287 |
| 2015/0276208 A1 | 10/2015 | Maturana et al. ............. 700/274 |
| 2015/0284641 A1 | 10/2015 | Shi ................................. 208/113 |
| 2015/0330571 A1 | 11/2015 | Beuneken ......................... 141/4 |
| 2016/0033941 A1 | 2/2016 | T et al. ............................. 700/81 |
| 2016/0048119 A1 | 2/2016 | Wojsznis ........................... 700/11 |
| 2016/0098037 A1 | 4/2016 | Zornio et al. .................... 700/20 |
| 2016/0098234 A1 | 4/2016 | Weaver ........................ 358/1.15 |
| 2016/0122663 A1 | 5/2016 | Pintart et al. |
| 2016/0147204 A1 | 5/2016 | Wichmann et al. .......... 700/287 |
| 2016/0237910 A1 | 8/2016 | Saito |
| 2016/0260041 A1 | 9/2016 | Horn et al. |
| 2016/0291584 A1 | 10/2016 | Horn et al. |
| 2016/0292188 A1 | 10/2016 | Horn et al. |
| 2016/0292325 A1 | 10/2016 | Horn et al. |
| 2016/0313653 A1 | 10/2016 | Mink |
| 2016/0363315 A1 | 12/2016 | Colannino et al. |
| 2017/0009932 A1 | 1/2017 | Oh |
| 2017/0058213 A1 | 3/2017 | Oprins et al. .................. 585/303 |
| 2017/0082320 A1 | 3/2017 | Wang |
| 2017/0107188 A1 | 4/2017 | Kawaguchi |
| 2017/0284410 A1 | 10/2017 | Sharpe, Jr. |
| 2017/0315543 A1 | 11/2017 | Horn et al. |
| 2017/0323038 A1 | 11/2017 | Horn et al. |
| 2017/0352899 A1 | 12/2017 | Asai |
| 2018/0046155 A1 | 2/2018 | Horn et al. |
| 2018/0081344 A1 | 3/2018 | Romatier et al. |
| 2018/0082569 A1 | 3/2018 | Horn et al. |
| 2018/0121581 A1 | 5/2018 | Horn et al. |
| 2018/0122021 A1 | 5/2018 | Horn et al. |
| 2018/0155638 A1 | 6/2018 | Al-Ghamdi ..................... 208/79 |
| 2018/0155642 A1 | 6/2018 | Al-Ghamdi et al. |
| 2018/0197350 A1 | 7/2018 | Kim |
| 2018/0275690 A1 | 9/2018 | Lattanzio et al. |
| 2018/0275691 A1 | 9/2018 | Lattanzio et al. |
| 2018/0275692 A1 | 9/2018 | Lattanzio et al. |
| 2018/0280914 A1 | 10/2018 | Victor et al. |
| 2018/0280917 A1 | 10/2018 | Victor et al. |
| 2018/0282633 A1 | 10/2018 | Van de Cotte et al. |
| 2018/0282634 A1 | 10/2018 | Van de Cotte et al. |
| 2018/0282635 A1 | 10/2018 | Van de Cotte et al. |
| 2018/0283368 A1 | 10/2018 | Van de Cotte et al. |
| 2018/0283392 A1 | 10/2018 | Van de Cotte et al. |
| 2018/0283404 A1 | 10/2018 | Van de Cotte et al. |
| 2018/0283811 A1 | 10/2018 | Victor et al. |
| 2018/0283812 A1 | 10/2018 | Victor et al. |
| 2018/0283813 A1 | 10/2018 | Victor et al. |
| 2018/0283815 A1 | 10/2018 | Victor et al. |
| 2018/0283816 A1 | 10/2018 | Victor et al. |
| 2018/0283818 A1 | 10/2018 | Victor et al. |
| 2018/0284705 A1 | 10/2018 | Van de Cotte et al. |
| 2018/0286141 A1 | 10/2018 | Van de Cotte et al. |
| 2018/0311609 A1 | 11/2018 | McCool et al. |
| 2018/0362862 A1 | 12/2018 | Gellaboina et al. |
| 2018/0363914 A1 | 12/2018 | Faiella et al. |
| 2018/0364747 A1 | 12/2018 | Charr et al. |
| 2019/0002318 A1 | 1/2019 | Thakkar et al. |
| 2019/0003978 A1 | 1/2019 | Shi et al. |
| 2019/0015806 A1 | 1/2019 | Gellaboina et al. |
| 2019/0041813 A1 | 2/2019 | Horn et al. |
| 2019/0083920 A1 | 3/2019 | Bjorklund et al. |
| 2019/0101336 A1 | 4/2019 | Victor et al. |
| 2019/0101342 A1 | 4/2019 | Victor et al. |
| 2019/0101907 A1 | 4/2019 | Charr et al. |
| 2019/0102966 A1 | 4/2019 | Lorenz |
| 2019/0108454 A1 | 4/2019 | Banerjee et al. |
| 2019/0120810 A1 | 4/2019 | Kumar KN et al. |
| 2019/0151814 A1 | 5/2019 | Victor et al. |
| 2019/0155259 A1 | 5/2019 | Romatier et al. |

FOREIGN PATENT DOCUMENTS

| | | | |
|---|---|---|---|
| EP | 2801937 A1 | 11/2014 | ............ G06Q 10/06 |
| GB | 1134439 A | 11/1968 | ............ G01N 31/22 |
| JP | 2008031940 A | 2/2008 | |
| WO | WO 1990/010083 A1 | 9/1990 | ............ C12Q 1/04 |
| WO | WO 2001/060951 A1 | 8/2001 | ............ C10G 51/04 |
| WO | WO 2006/044408 A1 | 4/2006 | ............ F23D 14/72 |
| WO | WO 2007/095585 A2 | 8/2007 | ......... A61K 31/721 |
| WO | WO 2009/046095 A1 | 4/2009 | ............ G06F 11/00 |
| WO | WO 2014/042508 A1 | 3/2014 | ............ G06Q 50/04 |
| WO | WO 2014/123993 A1 | 8/2014 | ............ G06F 17/00 |
| WO | WO 2016/141128 A1 | 9/2016 | ............ G06Q 10/06 |
| WO | WO 2017/079058 A1 | 5/2017 | ............ B01D 1/14 |

OTHER PUBLICATIONS

Dec. 27, 2018—PCT/U.S. Notice of Publication—App 2018/038286.

Nov. 29, 2018—PCT/U.S. International Search Report—App 2018/038286.

2001 Control systems of chemical and technological processes, Bespalov A. V. et al, pp. 508-509.

(56) References Cited

OTHER PUBLICATIONS

Nov. 29, 2018—PCT/U.S. Notification of Transmittal of the International Search Report—App 2018/038286.
Bespalov A. V. et al., Control systems of chemical and technological processes, pp. 508-509 (2001) (Russian).
Daniel Goebel, Dry Gas Seal Contamination During Operation and Pressurization Hold, [online], Feb. 2016, [retrieved on Jun. 19, 2019]. Retrieved from <https ://core.ac.uk/download/pdf/84815277. pdf> (Year: 2016).
EnergyMEDOR®, Product brochure (Nov. 2014).
Chistof Huber, Density and Concentration Measurement Application for Novel MEMS-based Micro Densitometer for Gas, [online], 2016, [retrieved on Jun. 19, 2019]. Retrieved from <https://www.ama-science.org/proceedings/getFile/ZwZ1 BD==> (Year: 2016).
Lotters, Real-time Composition Determination of Gas Mixtures, [online], 2015, [retrieved on Jun. 19, 2019]. Retrieved from <https://www.ama-science.org/proceedings/getFile/ZwNOZj==>(Year: 2015).
Maybeck, Peter S., "Stochastic models, estimation, and control," vol. 1, Academic Press (1979), 19 pages.

\* cited by examiner

INCIPIENT TEMPERATURE EXCURSION MITIGATION AND CONTROL

CROSS REFERENCE TO RELATED APPLICATION

This application claims the benefit under 35 U.S.C. 119(e) of U.S. Provisional Patent Application No. 62/522,612, filed Jun. 20, 2017, which is incorporated by reference herein.

TECHNICAL FIELD

The present disclosure is related to a method and system for managing the operation of a plant, such as a chemical plant or a petrochemical plant or a refinery, and more particularly to a method for improving on-stream reliability by preventing and mitigating temperature related emergency shutdowns of an operating plant. Typical plants may be those that provide hydrocarbon cracking, hydrotreating, isomerization, exothermic process plants, and/or other process units where potentially exothermic reactions take place. Other units may include units with depressure systems.

BACKGROUND

Industrial process control and automation systems are often used for large and complex industrial processes. Industrial processes are typically implemented using large numbers of devices, such as pumps, valves, compressors, or other industrial equipment used to implement various aspects of the industrial processes. With these large numbers of devices, improving detection and prevention of equipment or process malfunctions can increase efficiency and safety of an operation of a plant or refinery.

SUMMARY

The following summary presents a simplified description of certain features. The summary is not an extensive overview and is not intended to identify key or critical elements.

One or more embodiments may include a system for preventing temperature excursion in a reactor. The system may include a reactor. The system may include a heater. The system may include a catalyst bed. The system may include a sensor configured to measure data associated with the catalyst bed. The system may include an analysis platform. The analysis platform may include one or more processors and memory. The memory may store executable instructions that, when executed, cause the analysis platform to: receive the data associated with the catalyst bed; analyze the data associated with the catalyst bed; determine, based on analyzing the data associated with the catalyst bed, whether a temperature of the reactor is above a threshold; and based on determining that the temperature of the reactor is above the threshold, send a message to a control system associated with the reactor, the message configured to cause an action to reduce the temperature of the reactor.

One or more embodiments may include non-transitory computer-readable media storing executable instructions that, when executed by one or more processors, cause a system including a reactor, a heater, a catalyst bed, and a sensor, to: receive, from the sensor, data measured by the sensor and associated with the catalyst bed; analyze the data associated with the catalyst bed; determine, based on analyzing the data associated with the catalyst bed, whether a temperature of the reactor is above a threshold; and based on determining that the temperature of the reactor is above the threshold, send a message to a control system associated with the reactor, the message configured to cause an action to reduce the temperature of the reactor.

One or more embodiments may include a method including receiving, by a computing device and from a sensor configured to measure data associated with a catalyst bed associated with a reactor, data measured by the sensor and associated with the catalyst bed; analyzing, by the computing device, the data associated with the catalyst bed; determining, by the computing device, based on analyzing the data associated with the catalyst bed, whether a temperature of the reactor is above a threshold; and based on determining that the temperature of the reactor is above the threshold, sending, by the computing device, a message to a control system associated with the reactor, the message configured to cause an action to reduce the temperature of the reactor.

Other technical features may be readily apparent to one skilled in the art from the following figures, descriptions, and claims.

BRIEF DESCRIPTION OF DRAWINGS

The present disclosure is illustrated by way of example and not limited in the accompanying figures in which like reference numerals indicate similar elements and in which:

FIGS. 2-1 to 2-6 depicts an illustrative arrangement of sensors in a hydrocracking reactor in accordance with one or more example embodiments;

FIG. 3 depicts an illustrative arrangement of thermocouples in a reactor in accordance with one or more example embodiments;

FIG. 4 depicts an illustrative flow diagram of the enhanced control system in accordance with one or more example embodiments;

DETAILED DESCRIPTION

Figure 1:
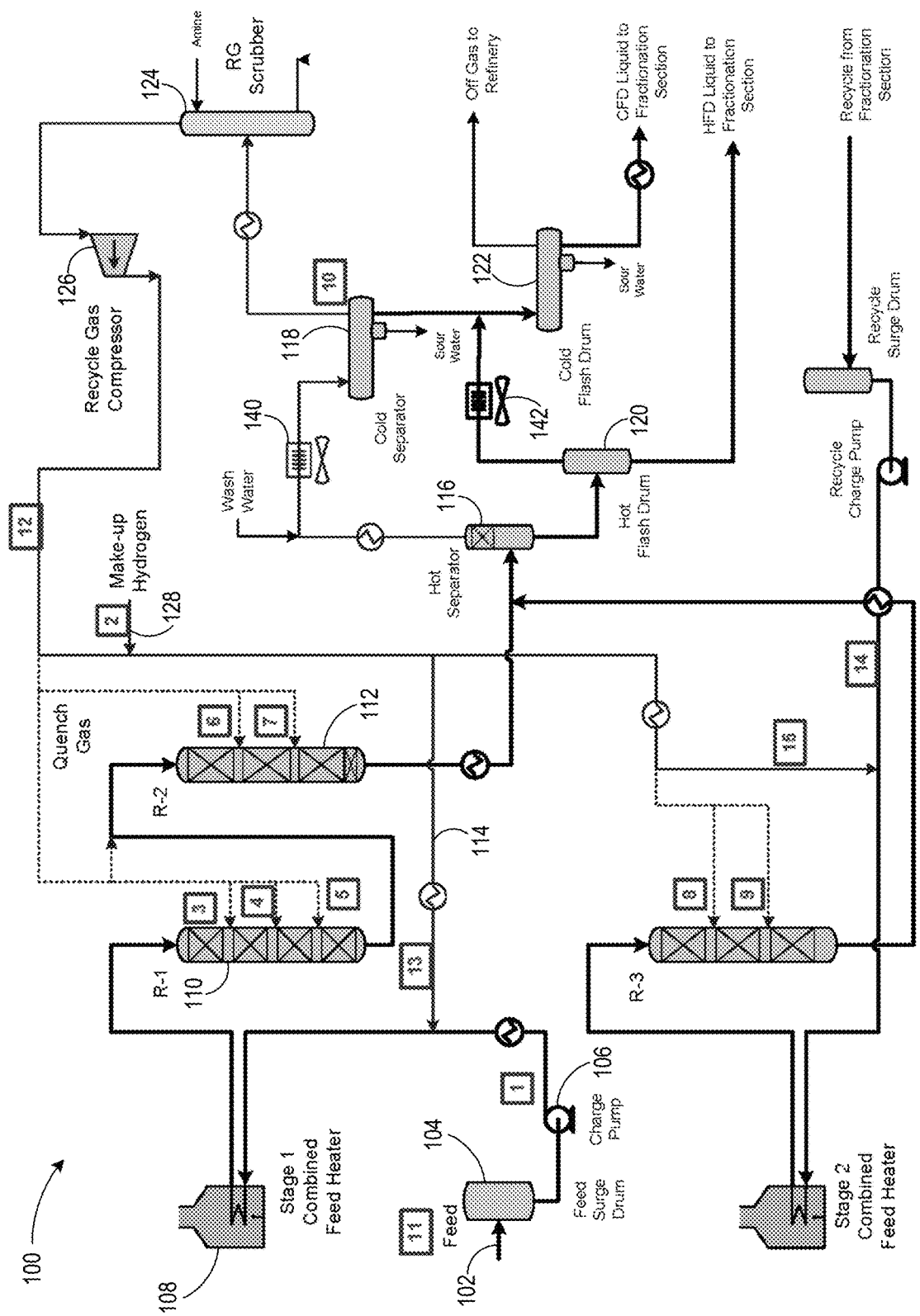
FIG. 1 depicts one possible illustrative arrangement for a catalytic hydrocracking process in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

References herein to a "plant" or "system" are to be understood to refer to any of various types of chemical and petrochemical manufacturing or refining facilities. References herein to a plant "operators" are to be understood to refer to and/or include, without limitation, plant planners, managers, engineers, technicians, technical advisors, specialists (e.g., in instrumentation, pipe fitting, and welding), shift personnel, and others interested in, starting up, overseeing, monitoring operations of, and shutting down, the plant.

Refining processes produce desirable products, such as Lube oil base stock, Kerosene fuel, diesel fuel and other products known as middle distillates, as well as lower boiling hydrocarbon liquids, such as LPG, naphtha and gasoline. For example, heavy petroleum fractions may be catalytically hydrocracked into lighter, more valuable products.

In one example of a catalytic exothermic refining process where the present disclosure can be applied, feedstocks most often subjected to hydrocracking are the gas oils and heavy atmospheric and vacuum gas oils recovered from crude oil by distillation and catalytically or thermally cracked gas oils. These feedstocks are converted to lower molecular weight products. Simultaneously with the hydrocracking, sulfur, nitrogen, and oxygen compounds are almost completely removed and olefins are saturated, thereby giving products which are a mixture of essentially pure paraffins, naphthenes, and aromatics. The hydrocracking reactions proceed to a desired conversion as the feed is processed over several fixed beds of catalyst at elevated hydrogen pressure and temperature. Reactive feeds may include Light Cycle Oil (LCO) and Coker Gas Oil (CGO)—heavy (HCGO) or light (LCGO). Less reactive feeds may include straight run Vacuum Gas Oil (VGO).

The process makes use of two groups of reactions, hydrotreating and hydrocracking, to make clean, saturated, high value products. The hydrotreating reactions remove contaminants from the feed and product streams, while the hydrocracking reactions create usable lighter molecular weight products. The primary hydrotreating reactions are sulfur and nitrogen removal as well as olefin saturation. The products of these reactions are the corresponding contaminant-free hydrocarbon, along with H2S and NH3. Other treating reactions include oxygen, metals and halide removal, and aromatic saturation. The reactions are typically carried out at elevated pressures and temperatures in a hydrogen atmosphere.

There are many hydrotreating/hydrocracking systems including single stage and two stage systems. FIG. 1 shows one typical arrangement for an Enhanced two stage hydrotreating/hydrocracking system 100. It is noted that FIG. 1 depicts a simplified version for illustrative purposes and further equipment such as additional heaters, exchangers, valves, instrumentation, and the like, will be present in fully operating systems.

Fresh feed (e.g., vacuum gas oil) 102 enters the system via feed surge drum 104. From the bottom of the surge drum the feed flows to the suction of the reactor charge pump 106. Hydrogen 114 may be added to the fresh feed stream before entering the heater 108. (Alternatively, the fresh feed may be combined with the hydrogen before the combined feed exchangers.)

The combined feed and hydrogen stream exchanges heat with the reactor effluent and is further heated in a combined feed heater 108. (Alternatively, feed and recycle gas are heated separately by exchange with reactor effluent, for example. The recycle gas may be further heated in a recycle gas heater and then joins with the feed at the reactor inlet.)

After heating, the feedstock enters a two-stage reactor system with catalytic reactor 110 and catalytic reactor 112. Reactors 110 and 112 each may be divided into individual catalyst beds supported on a beam and grid support system. The support system may be separated from the next bed of catalyst by a quench gas distributor, a reactant mixing chamber and a vapor/liquid distribution tray. The reactants flow downward through the catalyst beds.

After exiting the reactor 112, the product stream is separated from the reaction byproducts and excess recycle gas. A typical high conversion recycle operation unit incorporates a hot separator 116.

The hot separator vapor is normally cooled by exchange with the recycle gas stream. It may also be cooled by exchange with the liquid feed stream. The vapor is then further cooled in an air cooler 140 before entering the cold separator 118. The liquid hydrocarbon and water are allowed to settle in the separator. The water is sent to sour water treating facilities. The hydrocarbon liquid leaves the cold separator 118 and flows into the cold flash drum 122 where the liquid is depressured. As it flows across a level control valve, dissolved hydrogen, H2S, and light hydrocarbons are flashed off. Vapor is removed from the cold flash drum on pressure control. The hot separator liquid is routed to a hot flash drum 120 where dissolved hydrogen, H2S, and light hydrocarbon are flashed off. The flashed vapor from the hot flash drum is cooled via cooler 142 and then joins with the hydrocarbon liquid from the cold separator before entering the cold flash drum. Both hot and cold flash drum hydrocarbon liquids flow separately into the fractionation section.

The feed to the fractionation section will contain several species from hydrogen and hydrogen sulfide through the heaviest components, and this stream will be separated into the desired products such as light gases, LPG, gasoline, kerosene, diesel oil, and unconverted oil from the fractionator column bottoms.

After separation of the gas and liquid phases in the cold separator, the gas leaves from the top of the cold separator 118 and flows to the suction of the recycle gas compressor 126. In some cases the recycle gas will be first sent to an amine scrubber 124 to remove H2S. The recycle gas compressor 126 may be reciprocating or centrifugal.

After the recycle compressor discharge, some recycle gas will be split off the main stream for use as quench gas between catalyst beds of reactors 110 and 112. Separate quench gas streams are used to reduce reactor interbed temperatures before each catalyst bed. Quench flow is regulated by reactor bed inlet temperature, either by direct temperature control or by cascading through quench gas flow controller.

The bulk of the recycle gas is normally joined by the makeup gas 128. In some cases, the makeup gas joins the recycle gas before the recycle gas compressor. From this point, until it returns to the cold separator, the gas flows along with the liquid through the reactor circuit in the same manner previously described.

The makeup gas 128 for the unit is a hydrogen rich gas normally coming from a hydrogen plant. The makeup gas compressors will then compress the gas from supply pressure up to the reactor circuit pressure. From the discharge of the last stage of compression, the makeup gas typically joins the recycle gas at the discharge of the recycle gas compressor and flows to the reactors as described above. As hydrogen is consumed in the reactors, the pressure in the cold separator will start to decrease. This will in turn call for more makeup gas.

In each of the reactions described above, hydrogen is consumed and heat is released. All the major reactions are exothermic and result in a temperature rise across the reactors. The saturation of olefins generates the greatest amount of heat. Pressures generally range from 105-190 kg/cm2g (1500-2700 psig), and temperatures from 290-455° C. (550-850° F.).

Problems Encountered

Hydrocracking, hydrotreating, isomerization, or a number of different exothermic systems may be subject to reactor temperature excursions. As the reactants flow downward through the catalyst beds, chemical reactions occur. All the major chemical reactions which take place are exothermic; hence the temperature increases as the feed and recycle gas proceed through the catalyst beds. It is important that the temperature increase (delta T) be controlled carefully at all times. It is possible to generate more heat from the reactions than the flowing streams can remove from the reactors. If this happens, the temperature may increase very rapidly causing a temperature excursion or a temperature runaway. A temperature runaway is a very serious situation since extremely high temperatures can be generated within a short period of time. These high temperatures can cause damage to the catalyst, coking, and/or structural damage to the reactors or other equipment (e.g., reactor internals, reactor supports, piping, effluent exchangers), which result in expensive shutdowns and repairs of the reactor, the hydrocracking unit, or even other refinery units. In other instances, high temperatures may result in loss of containment (e.g., explosion, fire), environmental release of chemicals (e.g., hydrocarbons, sulfur compounds), and/or injury or death. It is important, therefore, to know if temperatures are rising above designed temperatures.

One cause of temperature excursion is uneven flow distribution. The gas and liquid reactants must be evenly (homogenously) distributed across the cross-sectional area of the reactor as they enter the catalyst bed and should flow down through the catalyst bed contacting all catalyst completely. If the flow distribution is not homogenous, less catalyst is available to promote reaction and higher temperatures are required to reach the desired conversion. This can lead to shortened catalyst life, catalyst "hot spots", catalyst temperatures which are in excess of the design temperature limit of the reactor vessel, damage to the vessel wall, and unstable temperature control. In some extreme cases, a local temperature runaway can develop which can go well over 540° C. (1000° F.). High localized temperatures can lead to increased coking and fusion of the catalyst.

Other causes of temperature excursions are feed composition changes causing increased cracking and heat release in catalyst beds, or changes in feed rate or recycle gas rate. To protect the reactors from damage due to extremely high temperatures, the unit should be depressured at the recommended high rate.

Depressuring the unit at the high rate is undesirable as it can cause extended downtime of the unit as well as associated refinery units, a loss in production, potential damage to the reactors, reactor internals, catalyst beds and the reactor effluent air coolers and environmental flaring of hydrocarbons and sulfur compounds.

A shutdown or a depressuring event typically results in approximately five days of loss of production, which can result in significant revenue losses.

Enhanced Control

Aspects of the disclosure provide an enhanced control system that provides early warnings of impending undesirable events, direct or indirect manipulation of certain process variables to reduce undesirable outcomes, and/or direct or indirect manipulation of certain process variables that may place the unit in a "safe park" state to avoid the high temperature trip, depressurization, and/or associated operating risks and losses.

An automated system may take control actions to restore normal operations or bring the process to a safe operating condition from which it can be easily restarted. The control actions may be triggered based on the detection of pre-defined patterns on key variables.

The control actions (e.g., increase quench to reduce temperature in the reactor beds) may be focused on reducing catalyst bed temperatures to prevent the runaway reaction from occurring. For example, the control actions may be focused on the bed where temperature elevation is detected and the beds immediately above and below as needed to direct available quench gas to where it is needed the most.

An automated system may eliminate operator hesitation and inconsistencies on executing recommended emergency procedures. The implementation of this system may allow for identifying and programmatically taking actions to mitigate the progression of a temperature excursion, thus preventing the emergency shutdown logic from triggering, which in turns avoids costly downtime and production losses. This system may be implemented on catalytic conversion units where exothermic reactions take place, for example, in potentially exothermic process units, such as hydrocracking units.

Figure 9:
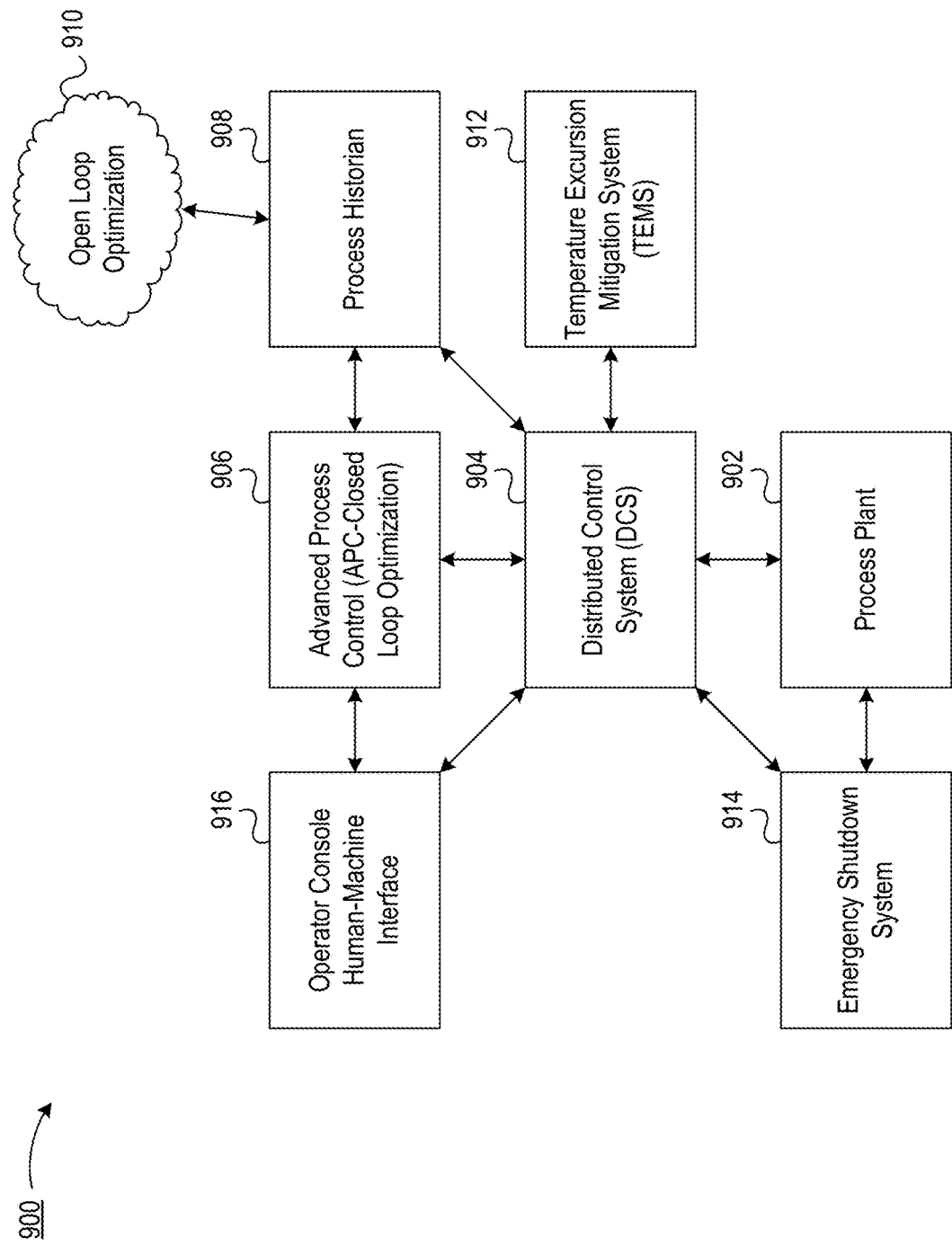
FIG. 9 depicts an illustrative computing environment for implementing temperature excursion mitigation in accordance with one or more example embodiments.

An illustrative diagram of an example system 900 for implementing early warnings of undesirable events is depicted in FIG. 9. One or more elements of this example system may be similar to and/or include one or more elements or similar elements to those described elsewhere herein (such as in connection with FIGS. 5A-5E). The system 900 for implementing early warnings of undesirable events at a process plant 902 (e.g., hydrocracking plant) may include one or more of a distributed control system 904, advanced process control 906, process historian 908, temperature excursion mitigation system 912, emergency shutdown system 914, and/or operator console human-machine interface 916.

The system 900 may be reliable, safe, and robust. The system 900 may include a fault-tolerant system with one or more processors, self diagnostics, redundant power supplies, and/or one or more certifications (e.g., TÜV AK 6 Certification).

Distributed control system 904 may be a local or remote control system that receives sensor data from one or more pieces of equipment in the process plant 902, and transmits control information to control operation of the one or more pieces of equipment in the process plant 902. Distributed control system 904 may be similar to, integrate, or be integrated in, for example, in a control platform (e.g., control platform 506, described herein). Distributed control system 904 may be a hydroprocessing unit distributed control system.

Advanced process control 906 may be associated with one or more closed loop optimization processes or services.

Process historian 908 may be associated with one or more open loop optimization processes or services 910 (e.g., connected performance services, process reliability advisor, process optimization advisor). The one or more open loop optimization processes or services 910 (e.g., connected performance services) may provide long term reliability and/or optimization (e.g., recommend changes) of one or more pieces of equipment in process plant 902.

Temperature excursion mitigation system 912 may be focused on closed loop risk mitigation. For example, temperature excursion mitigation system 912 may send electronic communication that changes or resets one or more process settings to mitigate temperature excursion (e.g., electronic communication that changes a digital controller set point). Temperature excursion mitigation system 912 may be similar to, integrate, or be integrated in, for example, in a data analysis platform (e.g., data analysis platform 504, described herein). Temperature excursion mitigation system 912 may be implemented on a Programmable Logic Controller (PLC) platform, or other suitable control solver platform, that communicates with distributed control system 904. Temperature excursion mitigation system 912 may implement at least one algorithm that monitors process variables measurements on a regular basis to detect the conditions that can potentially lead to a temperature excursion. Upon detection and verification of such condition(s), control actions may be sent to the distributed control system 904 in the form of single shot or repetitive commands via a communication protocol, and/or user notification alerts and/or alarms may be issued (e.g., via the distributed control system 904).

Emergency shutdown system 914 may perform or trigger emergency shutdown of process plant 902 or of one or more pieces of equipment in process plant 902.

Operator console human-machine interface 916 may include one or more devices (e.g., computer, terminal, tablet, laptop, smartphone) that include one or more graphical user interfaces (e.g., dashboard) for interacting with a human operator. The one or more graphical user interfaces may provide information on operations of process plant 902, such as operation information, warnings (e.g., warnings of potential temperature excursions, warnings of imminent temperature excursions, warnings of ongoing temperature excursions), alerts, or the like. The one or more graphical user interfaces may receive user input and cause one or more changes (e.g., via distributed control system 904) to the operation of process plant 902 or one or more pieces of equipment in process plant 902 (e.g., to stop or mitigate a temperature excursion). The temperature excursion mitigation system 912 may include a dedicated human-machine interface (e.g., computer, terminal, control panel, tablet, laptop, smartphone), that includes one or more graphical user interfaces for interacting with a human operator to change system configuration parameters and/or monitor the system performance.

Figure 10:
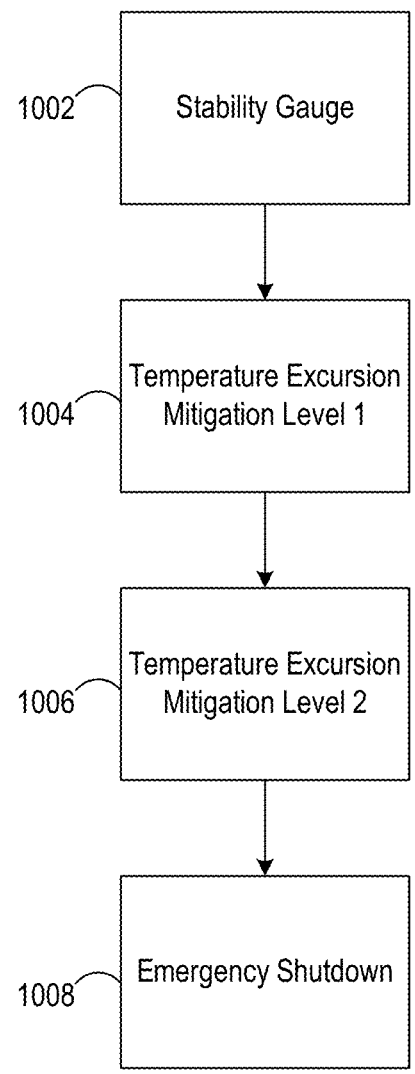
FIG. 10 depicts an illustrative multi-stage approach to temperature excursion mitigation in accordance with one or more example embodiments.

In one or more embodiments, a multi-stage (e.g., two, three, four stages) approach may be utilized to mitigate a potential temperature excursion. One example of a multi-staged approach is depicted in FIG. 10. In the depicted example, the multi-staged process may include use of a stability gauge 1002, an excursion mitigation level 1 response 1004, an excursion mitigation level 2 response 1006, and an emergency shutdown 1008. A system (e.g., temperature excursion mitigation system 912) may use an algorithm to determine if a temperature excursion is possible, likely, imminent, or occurring, and may enter one or more stages of the multi-stage approach based on one or more temperature excursion factors surpassing various thresholds (e.g., two different thresholds corresponding to two different stages).

A stage may include use of a stability gauge 1002 (e.g., similar to stability gauge 800 depicted in FIG. 8), which may allow for indication of causes and/or areas of concern. One or more objectives of the stability-gauge stage may include leaving control with operators as long as possible, providing a gauge to assist the operators, combining one or more (e.g., all) the process variables the operator should be watching onto one or more graphical user interfaces, and/or to maintain production (e.g., of a product of a plant) as long as possible. In one or more embodiments, the stability gauge may include one gauge combining key process variables. A stability gauge may be associated with a process plant 902, or may be associated with one or more pieces of equipment in process plant 902. One or more pieces of equipment in process plant 902 may be associated with one or more stability gauges.

In one or more embodiments, one or more devices (e.g., temperature excursion mitigation system 912) may include an algorithm to determine unit stability and/or areas of concern. In one or more embodiments, the algorithm may determine unit stability and/or areas of concern using one or more process variables, such as, for example, reactor temperatures (e.g., radial temperature, axial temperature, rate of change, hot spots), LHSV (e.g., feed rate), feed stock type (e.g., reactive feeds), quench gas rates, spare quench capacity, makeup gas consumption, unit pressure, and/or the like. In one or more embodiments, the algorithm may apply a weighting to one or more of the process variables when determining unit stability and/or areas of concern. One or more of the process variables and/or a result of the algorithm may be displayed as a stability gauge (e.g., stability gauge 800).

Thus, one or more aspects of the present disclosure may include a stability gauge, based on a weighted algorithm, to alert when the unit is moving away from a stable state and is becoming more susceptible to a temperature runaway.

A stage may include an excursion mitigation level 1 stage (e.g., excursion mitigation level 1 stage 1004) to re-establish control. Excursion mitigation level 1 stage may have objectives, for example, such as the system recognizing a risk of an excursion, automating an action in response (e.g., to eliminate hesitation), and/or taking limited action to attempt to intervene and reestablish control. One or more secondary goals may include maintaining production.

In one or more embodiments, an automated action may include, for example, removing reactive feed stocks. Another automated action may include maintaining a constant feed rate. Another automated action may include reducing charge heater outlet temperature. For example, an automated action may include ramping down charge heater outlet temperature controller setpoint to decrease temperature by an amount (e.g., 5° F., 10° F., 15° F., 20° F., or the like) at a rate (e.g., 0.1° F., 0.2° F., 0.3° F., 0.4° F., 0.5° F., 0.6° F., 0.7° F., or the like per second) in one shot or multiple repetitions.

Another automated action may include reducing temperature in reactor bed N with elevated temperatures. For example, an automated action may include ramping down reactor cracking bed N inlet temperature controller setpoint to decrease temperature by an amount (e.g., 5° F., 10° F., 15° F., 20° F., or the like) at a rate (e.g., 0.1° F., 0.2° F., 0.3° F., 0.4° F., 0.5° F., 0.6° F., 0.7° F., or the like per second) in one shot or multiple repetitions.

Another automated action may include reducing the temperature in other reactor beds. For example, an automated action may include ramping down reactor cracking bed N+1 (e.g., the reactor bed immediately below) inlet temperature controller setpoint to decrease temperature by an amount (e.g., 5° F., 10° F., 15° F., 20° F., or the like) at a rate (e.g., 0.1° F., 0.2° F., 0.3° F., 0.4° F., 0.5° F., 0.6° F., 0.7° F., or the like per second) in one shot or multiple repetitions.

An automated action may include activating one or more alerts or alarms (e.g., alerting that temperature excursion control scheme Level 1 is activated). An automated action may include shedding a higher-level control scheme. An automated action may include resetting the setting of one or more of the more reactive feed flow controllers (e.g., a reactive feed flow controller, such as Light Cycle Oil (LCO) flow controller, Coker Gas Oil (CGO) flow controller) to reduce flow by a predefined percentage. An automated action may include compensating for feed reduction (e.g., LCO/CGO feed reduction) with less reactive feed, such as Straight Run Vacuum Gas Oil (VGO) and/or VGO from Storage to maintain level in the feed surge drum.

When all timers expire, temperature ramps have finished, and all steps are completed, an indicator and/or alert may indicate that the excursion mitigation level 1 stage is complete.

A stage may include an excursion mitigation level 2 stage (e.g., excursion mitigation level 2 stage 1006) to provide a safe park for a unit. A safe park may significantly improve startup/shutdown operations, especially after an excursion. Excursion mitigation level 2 stage may have objectives such as, for example, recognizing that an excursion is imminent, automating an action in response (e.g., to eliminate hesitation), placing the unit in a safe state, leaving the unit in a condition where restart can be fast and easy, and/or avoiding depressuring of the unit.

In one or more embodiments, an automated action may include, for example, activating one or more alerts or alarms (e.g., alerting that temperature excursion control scheme phase 2 is activated). An automated action may include ramping charge heater outlet temperature down to a predefined temperature (e.g., to 300° F., 400° F., 500° F., 600° F., or the like). An automated action may include checking operation at and/or near minimum burner pressure.

An automated action may include bypassing a combined feed exchanger, which may be done while avoiding a high temperature shutdown on a reactor effluent air cooler.

An automated action may include ramping down combined feed heat exchangers outlet temperature controller setpoint to decrease temperature at a rate (e.g., 100° F., 200° F., 300° F., 400° F., 500° F., 600° F., or the like per hour) until reaching a threshold temperature (e.g., 300° F., 400° F., 500° F., 600° F., or the like). If the temperature reaches a reactor effluent air cooler inlet pretrip point, an alert and/or alarm may be triggered and/or sent. Alternatively or additionally, the ramp down of combined feed from combined feed exchangers outlet temperature controller setpoint may be paused and/or the bypass valves may be directly manipulated by the excursion mitigation system through an internal control algorithm to prevent the temperature from reaching the trip point. High reactor effluent air coolers 140 and/or 142 inlet temperatures alarm may be generated while the ramp down is paused. After the alarm is reset, ramp may resume. For example, the ramp may resume and alarm be reset by reactor effluent air cooler inlet pretrip reset.

Another automated action may include ramping all reactor temperatures (e.g., in a particular unit or in an entire plant) down to a particular temperature (e.g., to 300° F., 400° F., 500° F., 600° F., or the like). For example, an automated action may include ramping down all the reactor beds inlet temperature controllers setpoints to decrease the temperature at a rate e.g., 100° F., 200° F., 300° F., 400° F., 500° F., 600° F., or the like per hour) until reaching a threshold temperature (e.g., 300° F., 400° F., 500° F., 600° F., or the like). In one or more embodiments, if the recycle gas flow goes below a pretrip point (which may be set above the recycle gas low flow shutdown trip point), then the ramp down of all reactors beds inlet temperature controllers may be paused. An alarm (e.g., low recycle gas flow alarm) may be generated while the ramp down is paused. The ramp may resume and the alarm be reset by recycle gas flow pretrip reset.

Another automated action may include reducing a pressure of the unit by a particular percentage (e.g., 5%, 6%, 7%, 8%, 9%, 10%, or the like) of operating pressure.

Another automated action may include reducing temperature in one or more other reactor catalyst beds. For example, an automated action may include ramping down reactor cracking bed N and N+1 inlet temperature controller setpoint to decrease temperature first by an amount (e.g., 30° F., 40° F., 50° F., 60° F., or the like) at a rate (e.g., 0.1° F., 0.2° F., 0.3° F., 0.4° F., 0.5° F., 0.6° F., 0.7° F., or the like per second), and the continue to decrease the temperature until reaching a temperature (e.g., 300° F., 400° F., 500° F., 600° F., or the like) at a rate (e.g., 100° F., 200° F., 300° F., 400° F., 500° F., 600° F., or the like per hour).

Another automated action may include ramping down a reactor's all other catalyst beds inlet temperature controller setpoint to decrease temperature until reaching a temperature (e.g., 300° F., 400° F., 500° F., 600° F., or the like) at a rate (e.g., 100° F., 200° F., 300° F., 400° F., 500° F., 600° F., or the like per hour).

When all timers expire, temperature ramps have finished, conditions have normalized (e.g., no longer in danger of a runaway), and all steps are completed, an indicator and/or alert may indicate that the excursion mitigation level 2 stage is complete.

Another automated action may include reducing the temperature of other reactor beds. For example, an automated action may include ramping down reactor cracking bed N−1 inlet temperature controller setpoint to decrease temperature by an amount (e.g., 5° F., 10° F., 15° F., 20° F., or the like) at a rate (e.g., 0.1° F., 0.2° F., 0.3° F., 0.4° F., 0.5° F., 0.6° F., 0.7° F., or the like per second).

A final stage may include an emergency shutdown stage (e.g., emergency shutdown stage 1008). A system may include an emergency interlock system (e.g., emergency shutdown system 914). The emergency shutdown stage may allow for an automated or manual shutdown of a unit, plant, or process to avoid or mitigate damage or a disaster. The emergency shutdown stage may be simple, easy to maintain, and/or avoid spurious shutdowns. The emergency shutdown stage may include depressuring to flare.

In conjunction with or in addition to the multi-stage approach described herein, some systems may use reactor models to adjust process control signals in a more predictive vs. reactive way, or to control ramping rates (e.g., for startup). In one or more embodiments, the present system may analyze operating data and apply experience-based control algorithms focused on excursion prevention and mitigation. Aspects of the present system may reduce unplanned shutdowns, eliminate associated flaring, eliminate associated equipment damage, eliminate associated production losses, and/or shorten time needed to regain full production.

The proper operation of the reactor unit may depend on the careful selection and control of the processing conditions. There are many process variables that may affect catalytic conversion process units performance including operating severity, product yields and quality, and catalyst life. By careful monitoring and control of these process variables, the unit can operate to its full potential. Monitoring also helps to collect data that can be correlated and used to predict behavior or problems in systems used in the same plant or in other plants and/or processes.

The amount of conversion which takes place in the reactors may be determined by several variables; the type of feedstock, the amount of time the feed is in the presence of catalyst, the partial pressure of hydrogen in the catalyst bed, and, the temperature of the catalyst and reactants. Generally, the higher the temperature, the faster the rate of reaction and therefore, the higher the conversion.

In one or more embodiments, a system may include a heater minimum firing mode. This feature may avoid burner flameout, which could lead to hazardous conditions in the heater fire box.

In one or more embodiments, a system may include an auto quench. An auto quench may be programmed to quench the beds requiring additional quench while staying within the constraints set to keep the required flow to the other beds.

In one or more embodiments, a system may include bed temperature control (e.g., bed outlet control, WABT control). For example, a refiner may set a temperature controller's setpoint based on the highest temperature in the bed.

In one or more embodiments, a system may include conversion control. This may be used (e.g., for two-stage units) to determine how to set conversion per pass. Balancing the conversion between the stages may improve operations.

Sensor Data Collection and Processing

Figure 5A:
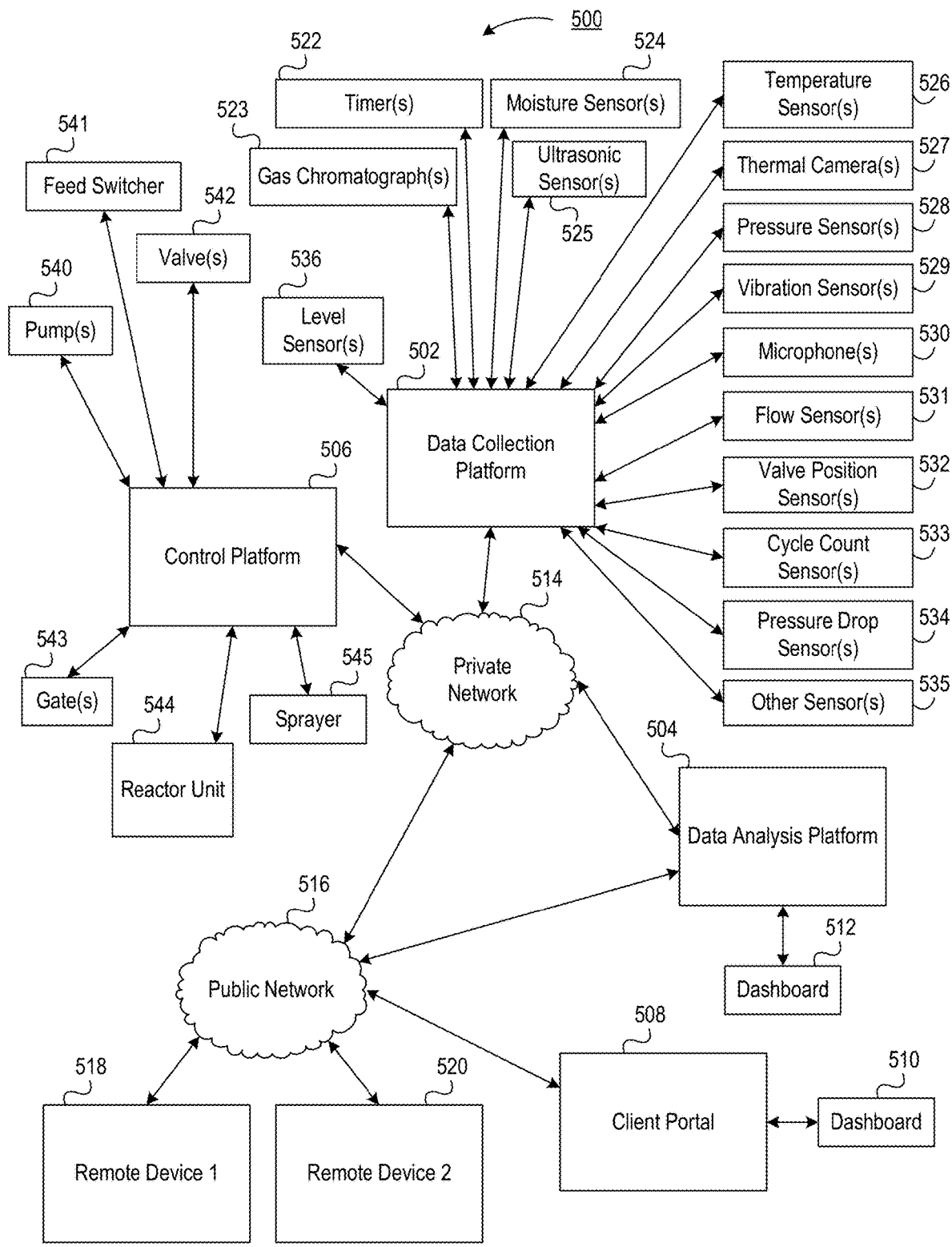
FIG. 5A depicts an illustrative computing environment for managing the operation of one or more pieces of equipment in a plant in accordance with one or more example embodiments.

The system may include one or more computing devices or platforms for collecting, storing, processing, and analyzing data from one or more sensors. FIG. 5A depicts an illustrative computing system that may be implemented at one or more components, pieces of equipment (e.g., catalytic reactors), and/or plants. FIG. 5A-FIG. 5E (hereinafter collectively "FIG. 5"), show, by way of illustration, various components of the illustrative computing system in which aspects of the disclosure may be practiced. It is to be understood that other components may be used, and structural and functional modifications may be made, in one or more other embodiments without departing from the scope of the present disclosure. Moreover, various connections between elements are discussed in the following description, and these connections are general and, unless specified otherwise, may be direct or indirect, wired or wireless, and/or combination thereof, and that the specification is not intended to be limiting in this respect.

FIG. 5A depicts an illustrative operating environment in which various aspects of the present disclosure may be implemented in accordance with example embodiments. The computing system environment 500 illustrated in FIG. 5A is only one example of a suitable computing environment and is not intended to suggest any limitation as to the scope of use or functionality contained in the disclosure. The computing system environment 500 may include various sensor, measurement, and data capture systems, a data collection platform 502, a data analysis platform 504, a control platform 506, one or more networks, one or more remote devices, and/or one or more other elements. The numerous elements of the computing system environment of FIG. 5A may be communicatively coupled through one or more networks. For example, the numerous platforms, devices, sensors, and/or components of the computing system environment may be communicatively coupled through a private network. The sensors be positioned on various components in the plant and may communicate wirelessly or wired with one or more platforms illustrated in FIG. 5A. The private network 514 may include, in some examples, a network firewall device to prevent unauthorized access to the data and devices on the private network. Alternatively, the private network 514 may be isolated from external access through physical means, such as a hard-wired network with no external, direct-access point. The data communicated on the private network 514 may be optionally encrypted for further security. Depending on the frequency of collection and transmission of sensor measurements and other data to the data collection platform, the private network may experience large bandwidth usage and be technologically designed and arranged to accommodate for such technological issues. Moreover, the computing system environment 500 may also include a public network 516 that may be accessible to remote devices. In some examples, the remote device may be located not in the proximity (e.g., more than one mile away) of the various sensor, measurement, and data capture systems illustrated in FIG. 5A. In other examples, the remote device may be physically located inside a plant, but restricted from access to the private network 514; in other words, the adjective "remote," need not necessarily require the device to be located at a great distance from the sensor systems and other components.

Although the computing system environment 500 of FIG. 5A illustrates logical block diagrams of numerous platforms and devices, the disclosure is not so limited. In particular, one or more of the logical boxes in FIG. 5 may be combined into a single logical box or the functionality performed by a single logical box may be divided across multiple existing or new logical boxes. For example, aspects of the functionality performed by the data collection platform may be incorporated into one or each of the sensor devices illustrated in FIG. 5A. As such, the data collection may occur local to the sensor device, and the enhanced sensor system may communicate directly with one or more of the control platform and/or data analysis platform. Such an embodiment is contemplated by FIG. 5A. Moreover, in such an embodiment, the enhanced sensor system may measure values common to a sensor, but may also filter the measurements such just those values that are statistically relevant or of-interest to the computing system environment are transmitted by the enhanced sensor system. As a result, the enhanced sensor system may include a processor (or other circuitry that enables execution of computer instructions) and a memory to store those instructions and/or filtered data values. The processor may be embodied as an application-specific integrated circuit (ASIC), FPGA, or other hardware- or software-based module for execution of instructions. In another example, one or more sensors illustrated in FIG. 5A may be combined into an enhanced, multi-purpose sensor system. Such a combined sensor system may provide economies of scale with respect to hardware components such as processors, memories, communication interfaces, and others.

In yet another example, the data collection platform 502 and data analysis platform 504 may reside on a single server computer and be depicted as a single, combined logical box on a system diagram. Moreover, a data store may be illustrated in FIG. 5A separate and apart from the data collection platform 502 and data analysis platform 504 to store a large amount of values collected from sensors and other components. The data store may be embodied in a database format and may be made accessible to the public network 516; meanwhile, the control platform 506, data collection platform 502, and data analysis platform 504 may be restricted to the private network 514 and left inaccessible to the public network 516. As such, the data collected from a plant may be shared with users (e.g., engineers, data scientists, others), a company's employees, and even third parties (e.g., subscribers to the company's data feed) without compromising potential security requirements related to operation of a plant. The data store may be accessible to one or more users and/or remote devices over the public network 516.

Referring to FIG. 5A, process measurements from various sensor and monitoring devices may be used to monitor conditions in, around, and on process equipment (e.g., catalytic reactors). Such sensors may include, but are not limited to, pressure sensors 528, differential pressure sensors, pressure drop sensors 534, flow sensors 531, temperature sensors 526 including thermocouples, thermal cameras 527, and skin thermocouples, capacitance sensors, weight sensors, gas chromatographs 523, hydrogen analyzers, sulfur analyzers, density analyzers, moisture sensors 524, ultrasonic sensors 525, position sensors (e.g., valve position sensors 532), timing sensors (e.g., timers 522), vibration sensors 529, microphones 530, level sensors 536, liquid level (hydraulic fluid) sensors, cycle count sensors 533, and/or other sensors 535 (e.g., sensors commonly found in the refining and petrochemical industry). Further, process laboratory measurements may be taken using equipment such as gas chromatographs 523 and/or liquid chromatographs, and may include, for example, distillation measurements, density measurements, cetane measurements and octane measurements, and/or other laboratory measurements. In one or more embodiments, system operational measurements also can be taken to correlate the system operation to the measurements of the one or more reactor units.

Other sensors may transmit signals to a processor or a hub that collects the data and sends to a processor. For example, temperature and pressure measurements may be sent to a hub (e.g., data collection platform 502). In one example, temperature sensors may include thermocouples, fiber optic temperature measurement, thermal cameras, and/or infrared cameras. Skin thermocouples may be applied to supports, walls, or other locations inside of or near a catalytic reactor unit. Alternatively, thermal (infrared) cameras may be used to detect temperature (e.g., hot spots) in all aspects of the equipment. A shielded (insulated) tube skin thermocouple assembly may be used to obtain accurate measurements. For example, a magnetic skin thermocouple may allow for installation without welding onto the reactor. Alternatively or additionally, clips and/or pads may be utilized for ease of replacement. As another example, Daily Thermetrics Cat-Tracker or Gayesco Flex-R multipoint thermocouples may be used for special catalyst bed temperature measurement.

Sensors may be also used throughout a plant to detect and monitor various issues such as maldistribution, thermal stresses, and temperature excursion.

Furthermore, flow sensors 531 may be used in flow paths such as the inlet to the path, outlet from the path, or within the path. If multiple feed pipes are utilized, the flow sensors 531 may be placed in corresponding positions in each of the pipes. Flow may be determined by pressure-drop across a known resistance, such as by using pressure taps. Other types of flow sensors 531 include, but are not limited to, ultrasonic sensors 525, turbine meter, hot wire anemometer, vane meter, Kármán™, vortex sensor, membrane sensor (membrane has a thin film temperature sensor printed on the upstream side, and one on the downstream side), tracer, radiographic imaging (e.g., identify two-phase vs. single-phase region of channels), an orifice plate in front of or integral to each tube or channel, pitot tube, thermal conductivity flow meter, anemometer, internal pressure flow profile, and/or measure cross tracer (measuring when the flow crosses one plate and when the flow crosses another plate).

Sensor data, process measurements, and/or calculations made using the sensor data or process measurements may be used to monitor and/or improve the performance and reliability of the process unit or the performance of the equipment and parts making up the equipment, as discussed in further detail below. For example, sensor data may be used to detect that a desirable or an undesirable chemical reaction (e.g., a temperature excursion) is taking place within a particular piece of equipment, and one or more actions may be taken to encourage or inhibit the chemical reaction (e.g., to slow, stop, or mitigate the temperature excursion). Chemical sensors may be used to detect the presence of one or more chemicals or components in the streams, such as corrosive species, oxygen, hydrogen, sulfur, and/or water (moisture). Chemical sensors may utilize gas chromatographs, liquid chromatographs, distillation measurements, density measurements, and/or octane measurements.

Monitoring the equipment and processes includes collecting data that can be correlated and used to predict behavior or problems in other plants and/or processes. Data collected from the various sensors (e.g., measurements such as temperature, pressure, flow, pressure drop, thermal performance, vessel skin temperature) may be correlated with external data, such as environmental or weather data. Process changes or operating conditions may be able to be altered to preserve the equipment or the catalyst until the next scheduled maintenance period. At a high level, sensor data collected (e.g., by the data collection platform 502) and data analysis (e.g., by the data analysis platform 504) may be used together, for example, for process simulation, equipment simulation, and/or other tasks. For example, sensor data may be used for process simulation and reconciliation of sensor data. The resulting, improved process simulation may provide a stream of physical properties that are used to calculate heat flow, etc. These calculations may lead to thermal and/or pressure-drop performance prediction calculations for specific equipment or the process, and comparisons of equipment or process predictions to observations from the operating data (e.g., predicted/expected outlet temperature and pressure vs. measured outlet temperature and pressure). This may be used for identification of conditions leading to temperature excursion, and/or other issues that eventually lead to a potential control changes and/or recommendation etc.

Corrective action may be taken based on determining this process and/or equipment information. One or more inputs or controls relating to a process may be adjusted as part of the corrective action. These and other details about the equipment, sensors, processing of sensor data, and actions taken based on sensor data are described in further detail below.

In addition, computing system environment 500 may include transmitters and deviation alarms. These may be programmed to set off an alarm, which may be audible and/or visual. In one or more embodiments, an alert may be transmitted to one or more devices (e.g., remote device 518, 520, client portal 508, dashboard 510, 512).

Systems Facilitating Sensor Data Collection

Sensor data may be collected by a data collection platform 502. The sensors may interface with the data collection platform 502 via wired or wireless transmissions. Sensor data (e.g., temperature data) may be collected continuously or at periodic intervals (e.g., every second, every five seconds, every ten seconds, every minute, every five minutes, every ten minutes, every hour, every two hours, or another interval). Data may be collected at different locations at different intervals. For example, data at a known hot spot may be collected at a first interval, and data at a spot that is not a known hot spot may be collected at a second interval. In another example, data for a catalyst bed with a history of temperature excursions may be collected at a different rate than data for a catalyst bed without history of temperature excursions. The data collection platform 502 may continuously or periodically (e.g., every second, every minute, every hour, every day, once a week, once a month, etc.) transmit collected sensor data to a data analysis platform 504, which may be nearby (e.g. local to) or remote from the data collection platform 502.

Figure 5B:
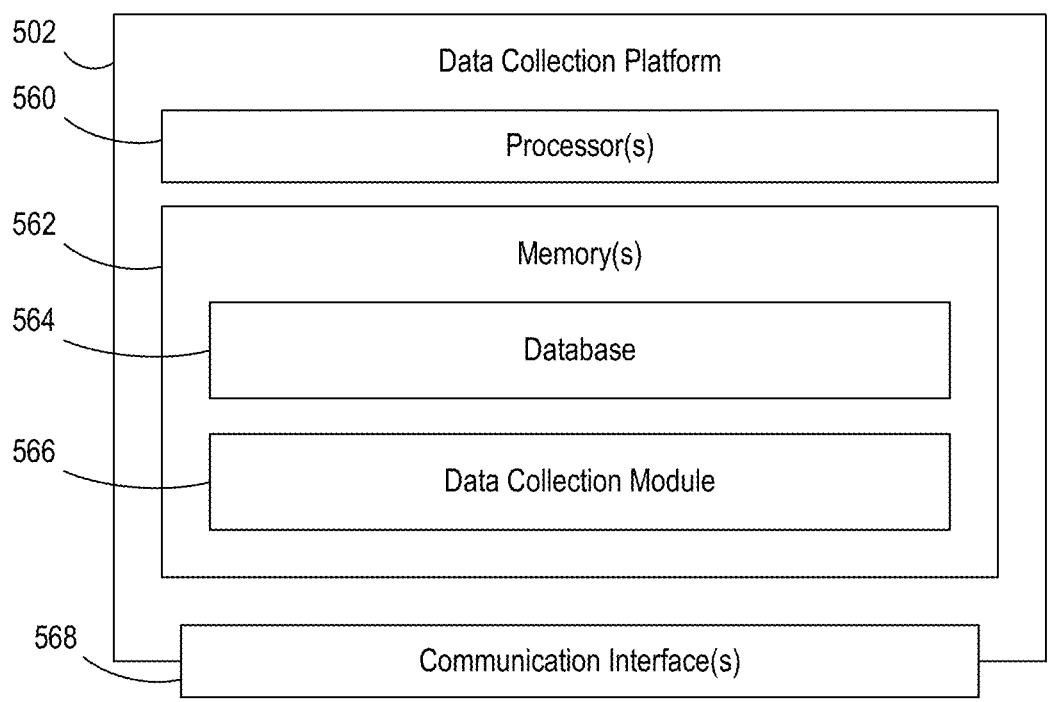
FIG. 5B depicts an illustrative data collection computing platform for collecting data related to the operation of one or more pieces of equipment in a plant in accordance with one or more example embodiments.
Figure 5C:
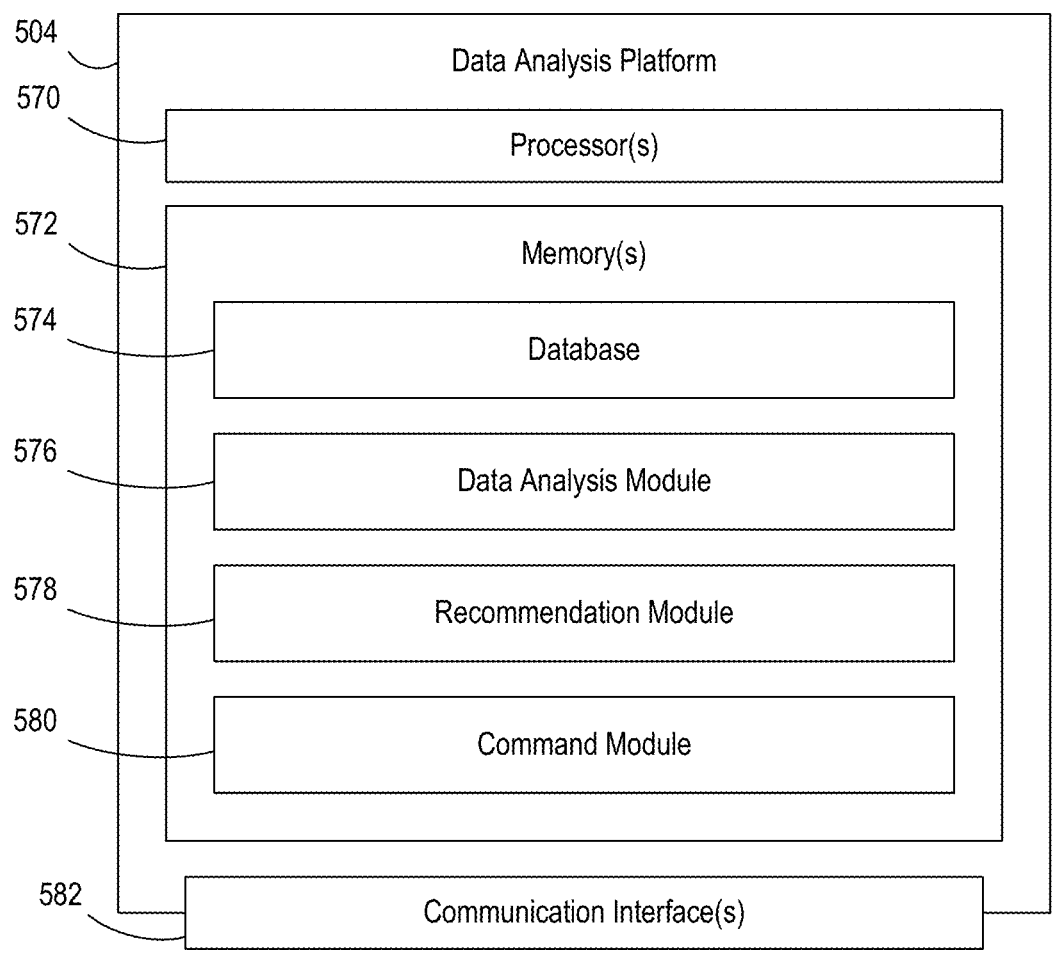
FIG. 5C depicts an illustrative data analysis computing platform for analyzing data related to the operation of one or more pieces of equipment in a plant in accordance with one or more example embodiments.
Figure 5D:
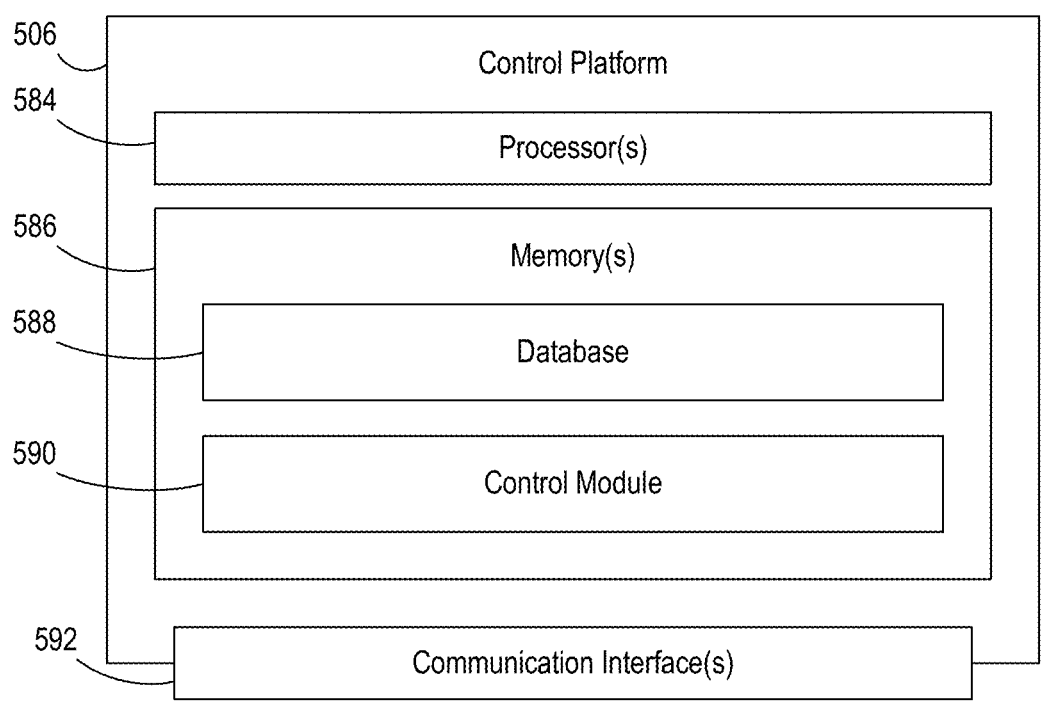
FIG. 5D depicts an illustrative control computing platform for controlling one or more pieces of equipment in a plant in accordance with one or more example embodiments.
Figure 5E:
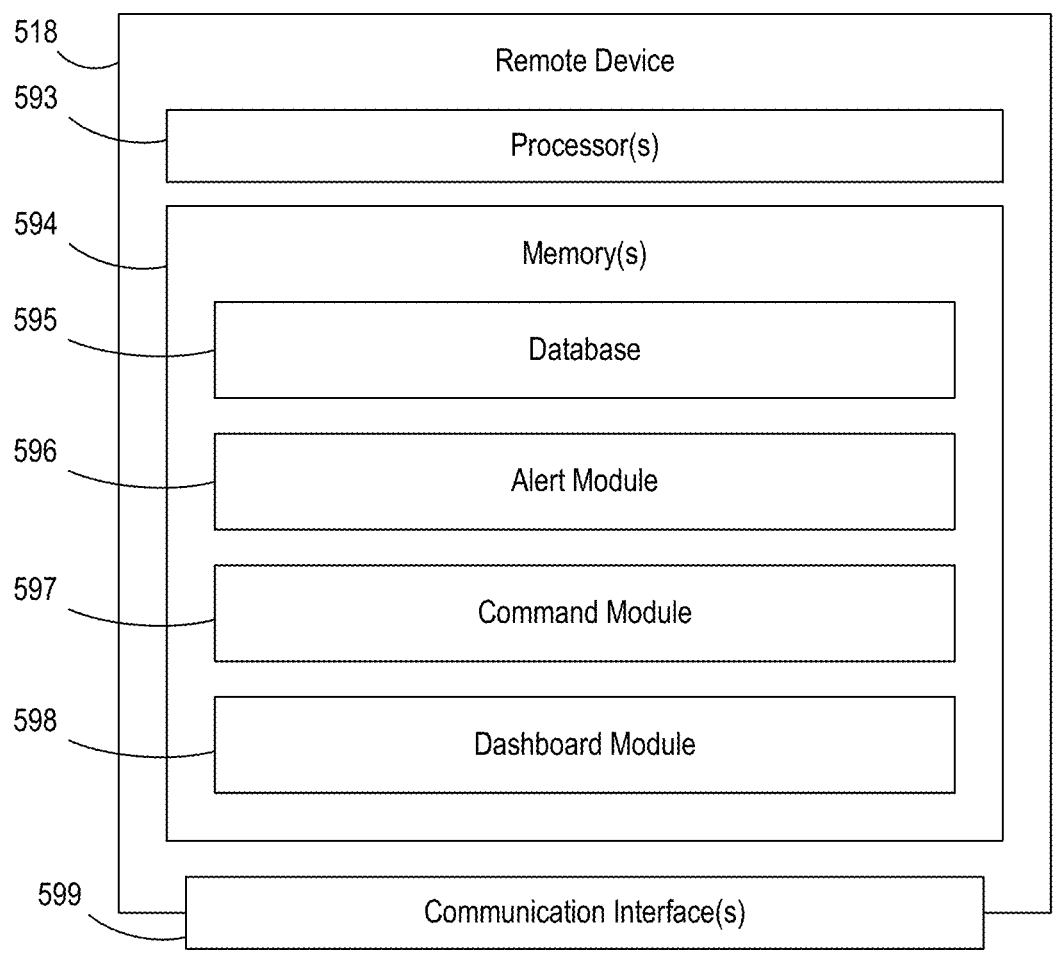
FIG. 5E depicts an illustrative remote device for analyzing data related to the operation of one or more pieces of equipment in a plant in accordance with one or more example embodiments.

The computing system environment 500 of FIG. 5A includes logical block diagrams of numerous platforms and devices that are further elaborated upon in FIG. 5B, FIG. 5C, FIG. 5D, and FIG. 5E. FIG. 5B is an illustrative data collection platform 502. FIG. 5C is an illustrative data analysis platform 504. FIG. 5D is an illustrative control platform 506. FIG. 5E is an illustrative remote device 518. These platforms and devices of FIG. 5 include one or more processing units (e.g., processors) to implement the methods and functions of certain aspects of the present disclosure in accordance with the example embodiments. The processors may include general-purpose microprocessors and/or special-purpose processors designed for particular computing system environments or configurations. For example, the processors may execute computer-executable instructions in the form of software and/or firmware stored in the memory of the platform or device. Examples of well-known computing systems, environments, and/or configurations that may be suitable for use with the disclosed embodiments include, but are not limited to, programmable logic controllers, distributed control systems, personal computers (PCs), server computers, hand-held or laptop devices, smart phones, multiprocessor systems, microprocessor-based systems, programmable consumer electronics, network PCs, minicomputers, mainframe computers, distributed computing environments that include any of the above systems or devices, and the like.

Figures 1, 2:
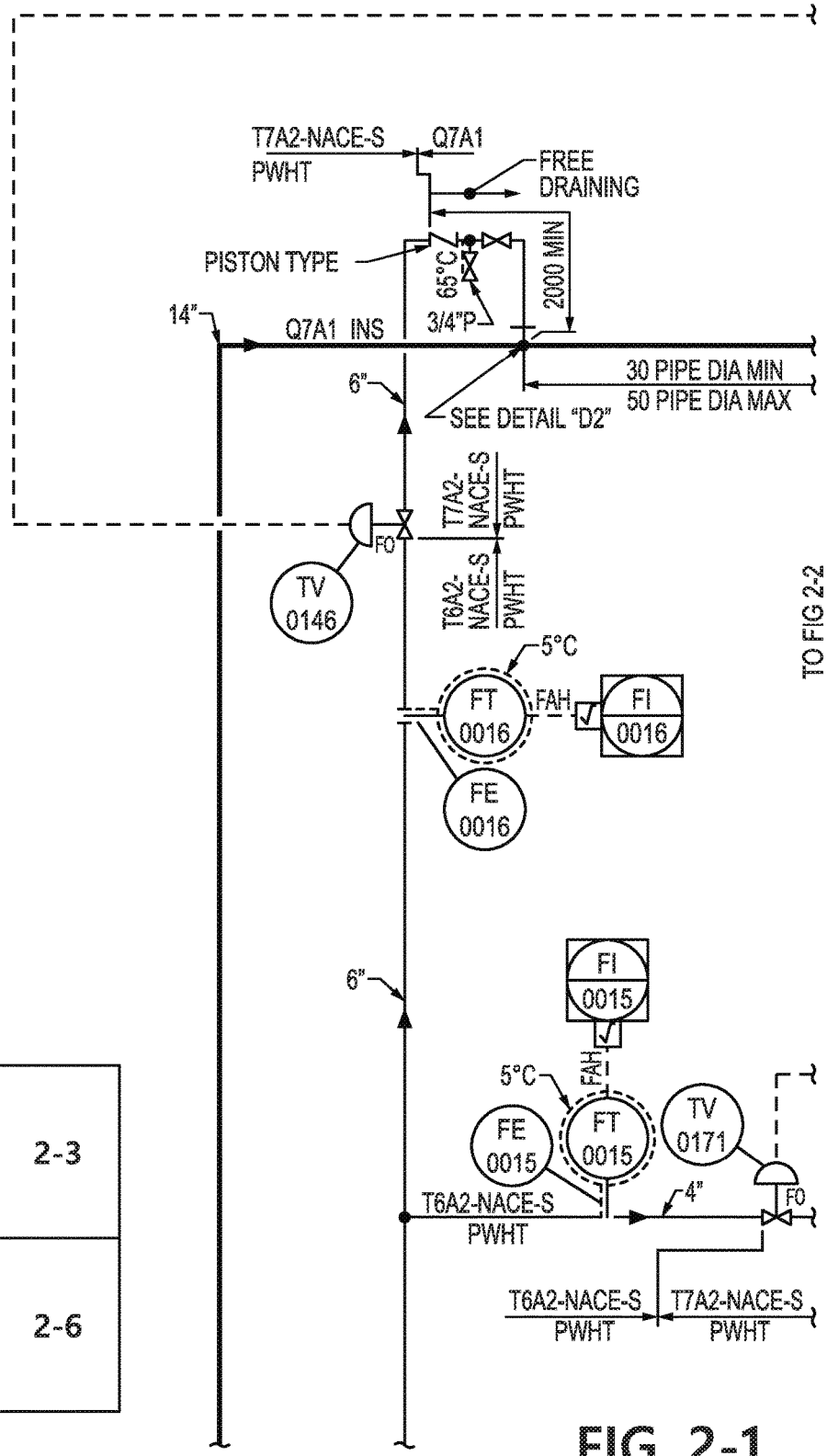
Figure 2:
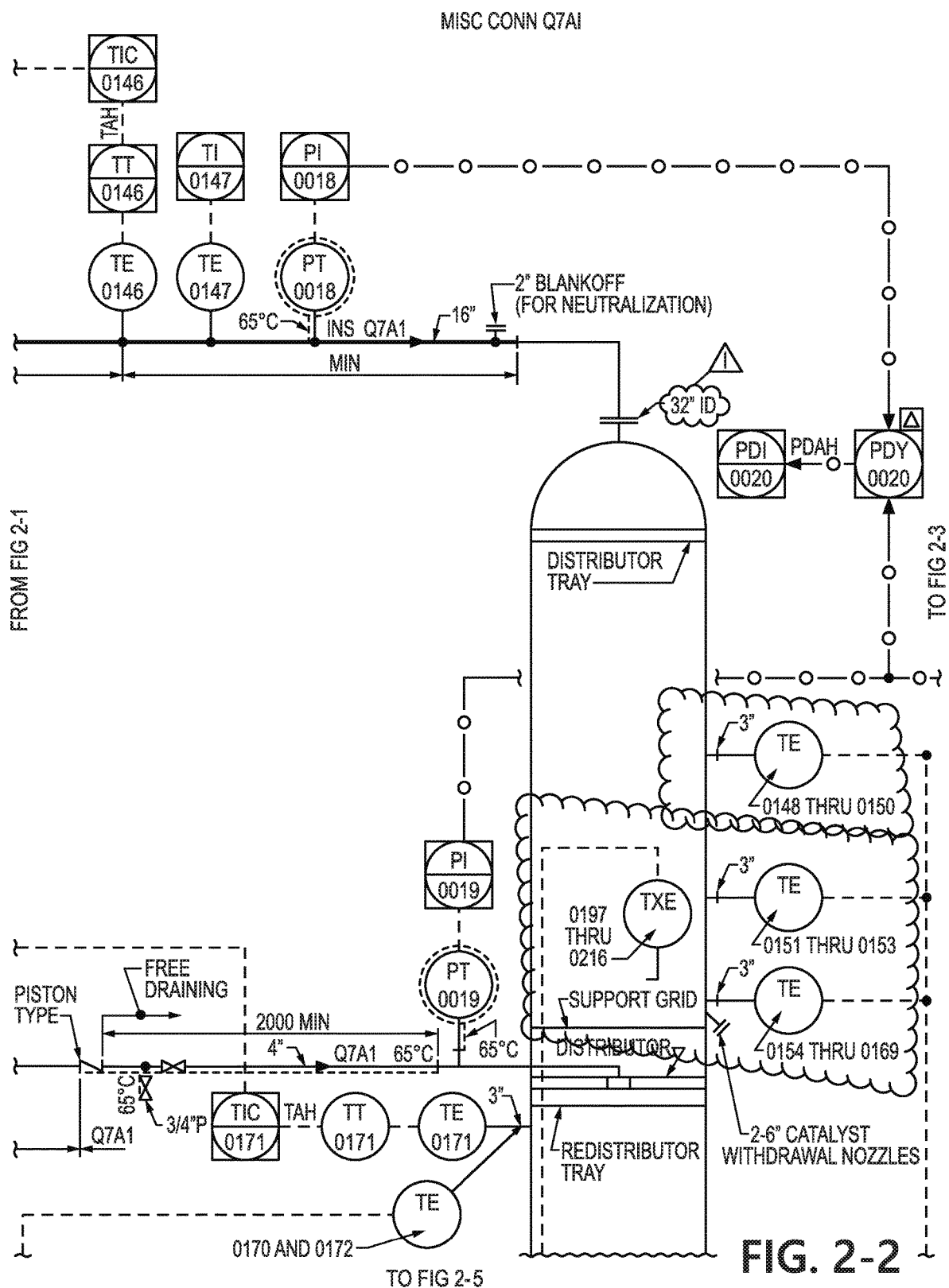
Figures 2, 3:
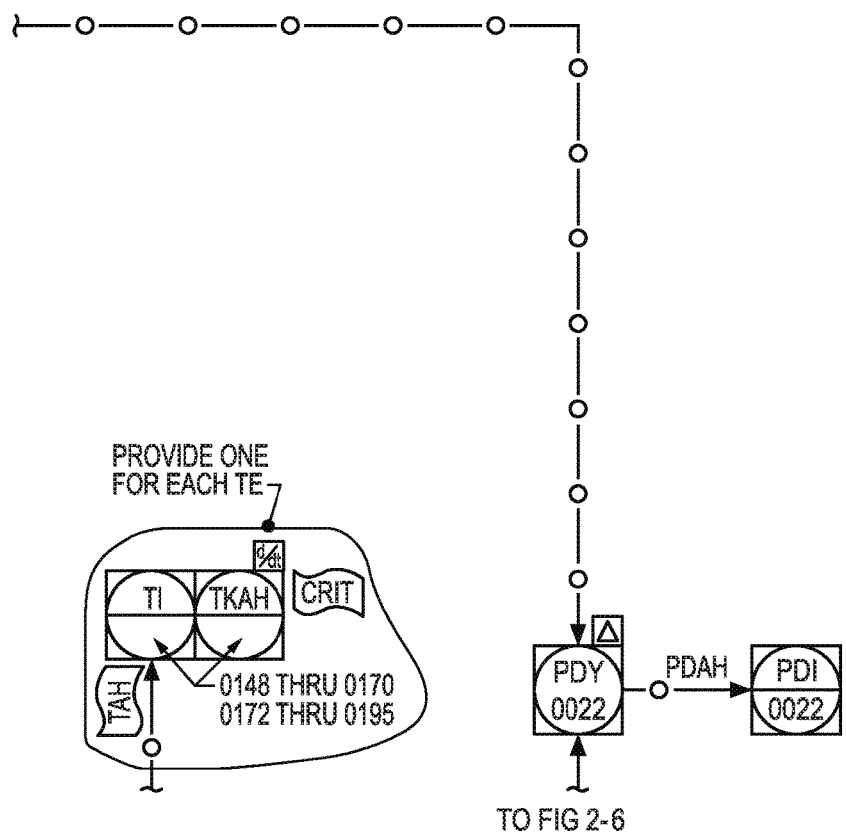
Figures 2, 3, 4:
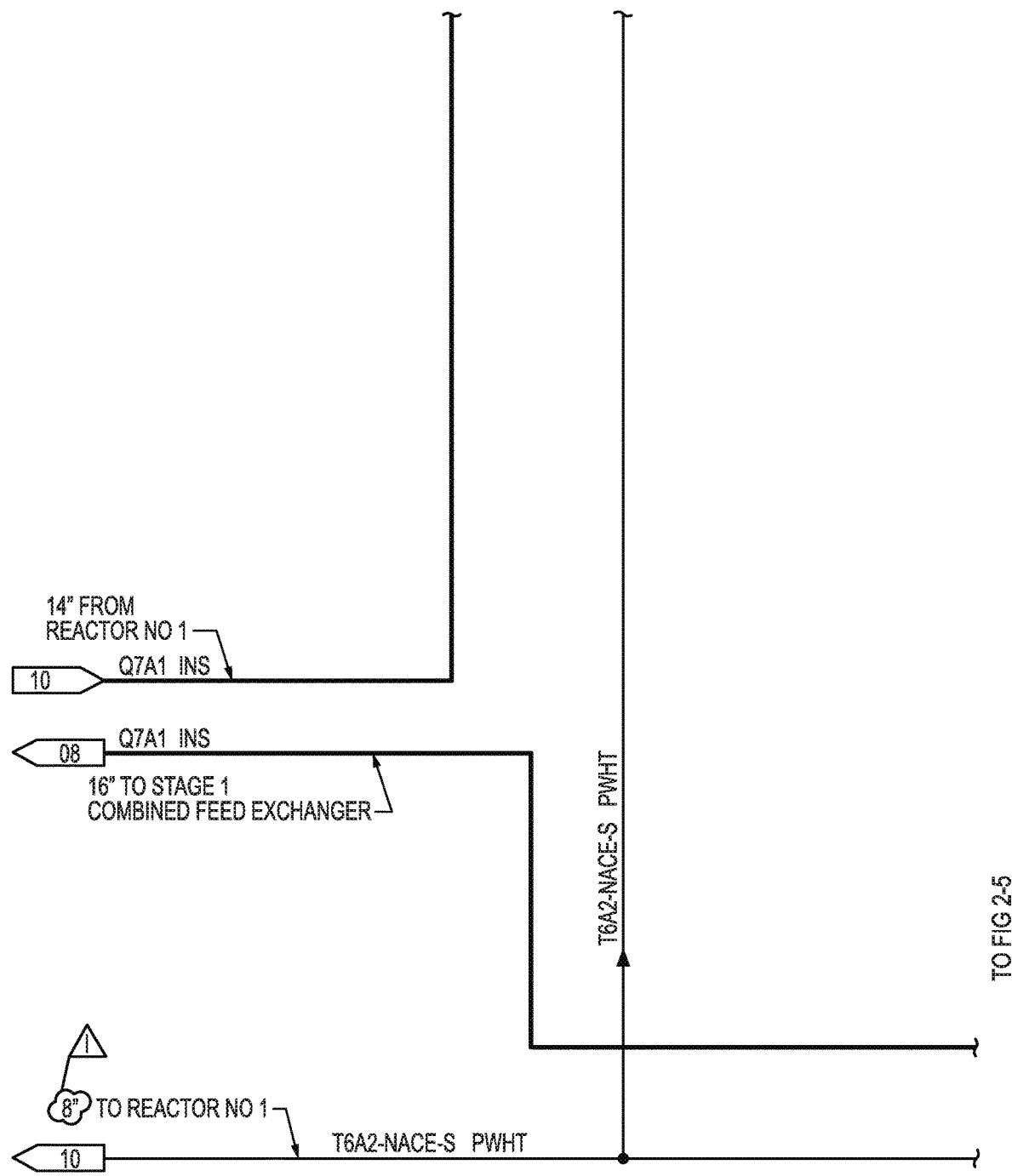
Figures 2, 3, 4, 5:
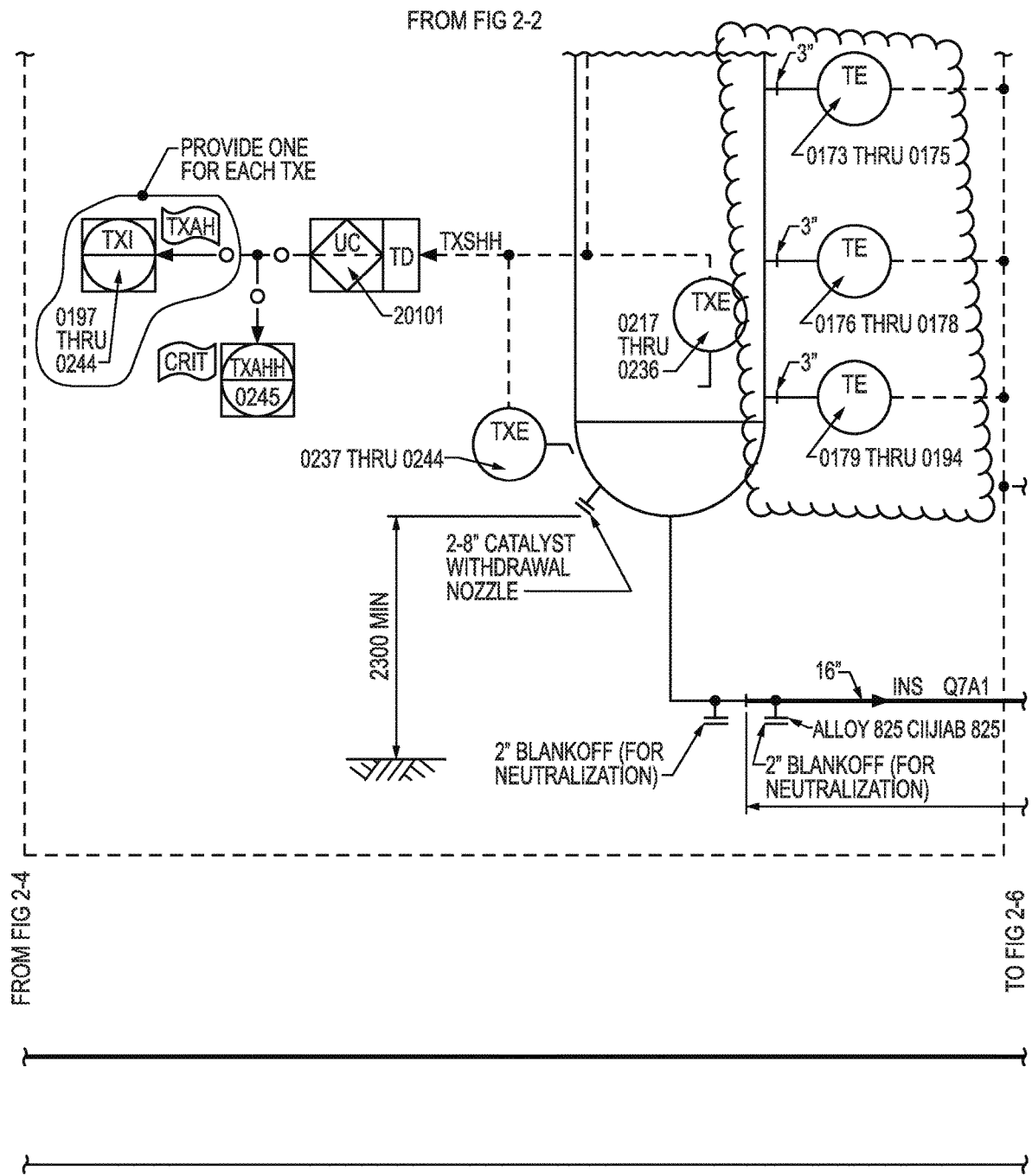
Figures 2, 3, 4, 5, 6:
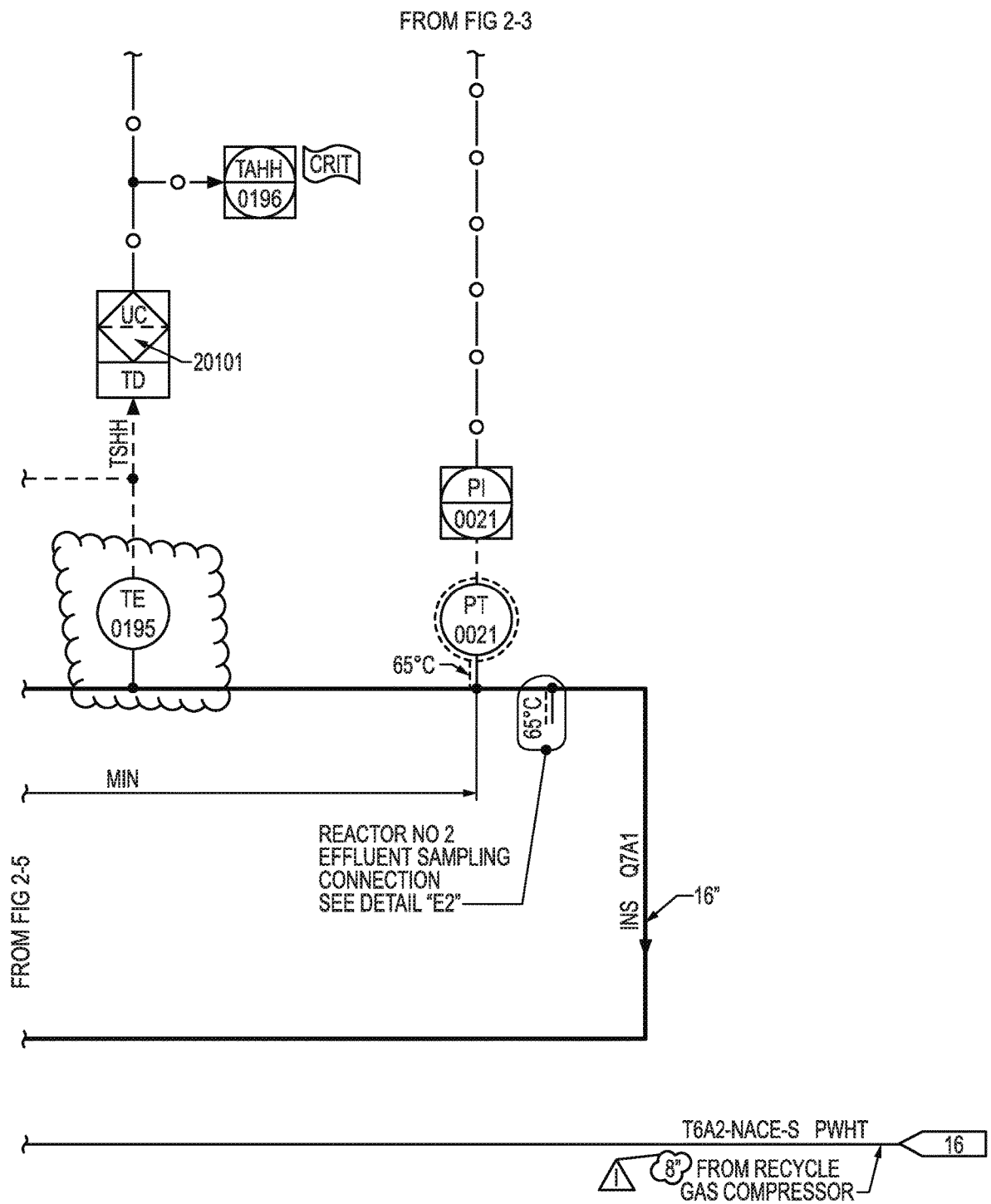
Figure 3:
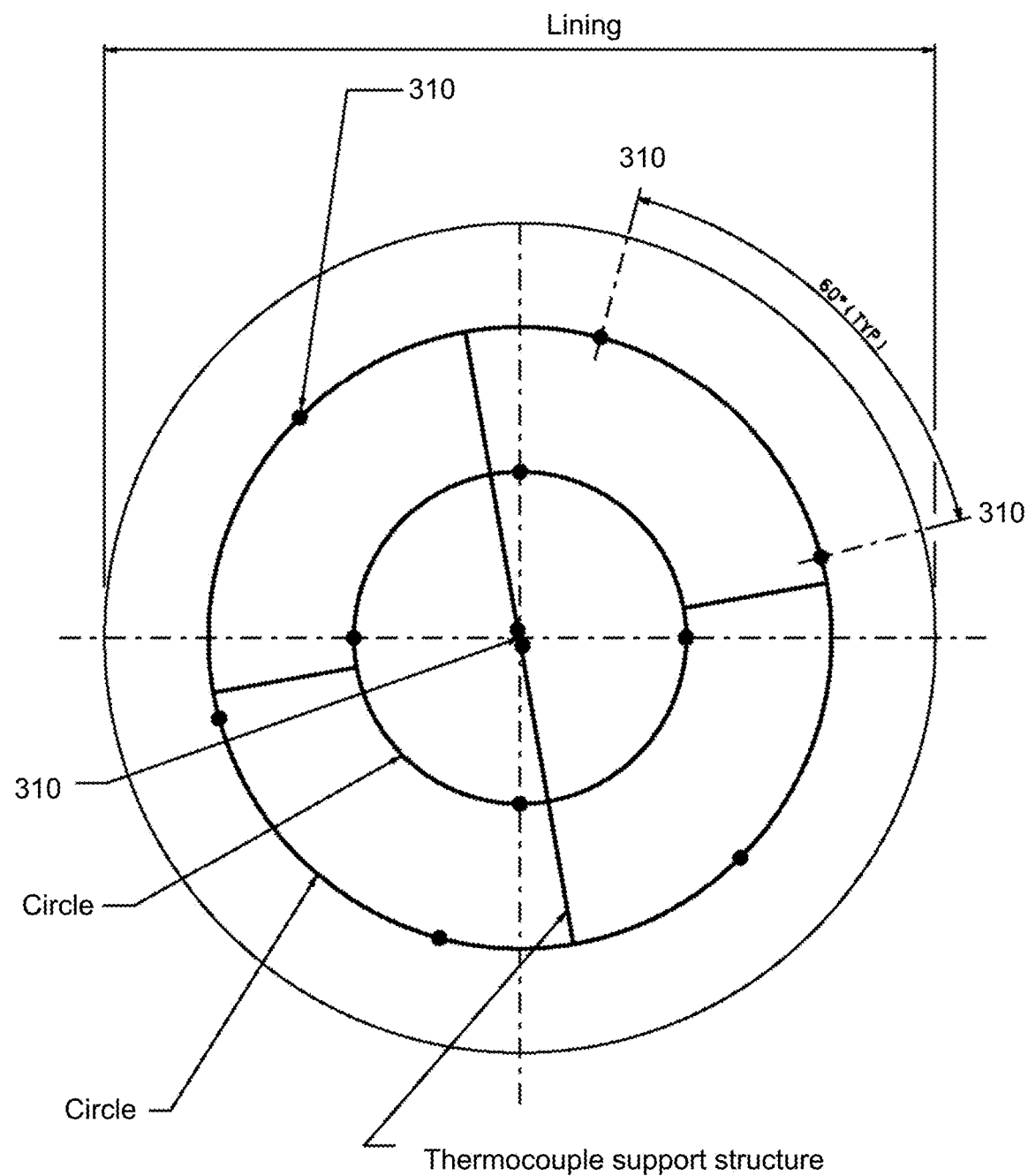
Figure 4:
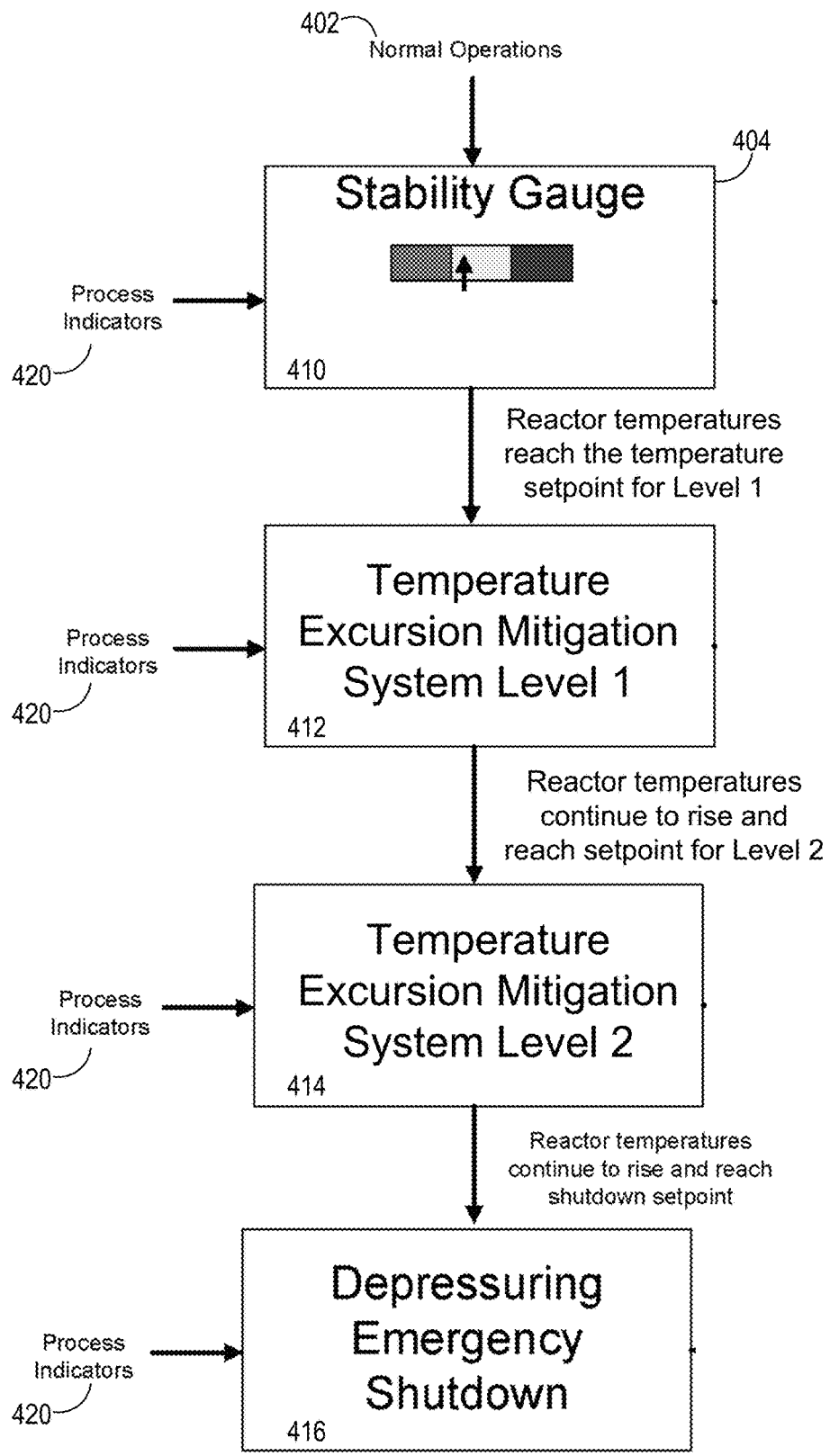

In addition, the platform and/or devices in FIG. 5 may include one or more memories include any of a variety of computer-readable media. Computer-readable media may be any available media that may be accessed by the data collection platform, may be non-transitory, and may include volatile and nonvolatile, removable and non-removable media implemented in any method or technology for storage of information such as computer-readable instructions, object code, data structures, database records, program modules, or other data. Examples of computer-readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by the data collection platform. The memories in the platform and/or devices may further store modules that may include compiled software code that causes the platform, device, and/or overall system to operate in a technologically improved manner as disclosed herein. For example, the memories may store software used by a computing platform, such as operating system, application programs, and/or associated database.

Furthermore, the platform and/or devices in FIG. 5 may include one or more communication interfaces including, but not limited to, a microphone, keypad, touch screen, and/or stylus through which a user of a computer (e.g., a remote device) may provide input, and may also include a speaker for providing audio output and a video display device for providing textual, audiovisual and/or graphical output. The communication interfaces may include a network controller for electronically communicating (e.g., wirelessly or wired) over a public network or private network with one or more other components on the network. The network controller may include electronic hardware for communicating over network protocols, including TCP/IP, UDP, Ethernet, RTU, and other protocols.

In some examples, one or more sensor devices in FIG. 5A may be enhanced by incorporating functionality that may otherwise be found in a data collection platform 502. These enhanced sensor systems may provide further filtering of the measurements and readings collected from their sensor devices. For example, with some of the enhanced sensor systems in the operating environment illustrated in FIG. 5A, an increased amount of processing may occur at the sensor so as to reduce the amount of data needing to be transferred over a private network in real-time to a computing platform. The enhanced sensor system may filter at the sensor itself the measured/collected/captured data and only particular, filtered data may be transmitted to the data collection platform for storage and/or analysis.

Referring to FIG. 5B, in one example, a data collection platform 502 may comprise a processor 560, one or more memories 562, and communication interfaces 568. The memory 562 may comprise a database 564 for storing data records of various values collected from one or more sources. In addition, a data collection module 566 may be stored in the memory 562 and assist the processor 560 in the data collection platform 502 in communicating with, via the communications interface 568, one or more sensor, measurement, and data capture systems, and processing the data received from these sources. In some embodiments, the data collection module 566 may comprise computer-executable instructions that, when executed by the processor 560, cause the data collection platform 502 to perform one or more of the steps disclosed herein. In other embodiments, the data collection module 566 may be a hybrid of software-based and/or hardware-based instructions to perform one or more of the steps disclosed herein. In some examples, the data collection module 566 may assist an enhanced sensor system with further filtering the measurements and readings collected from the sensor devices. Although the elements of FIG. 5B are illustrated as logical block diagrams, the disclosure is not so limited. In particular, one or more of the logical boxes in FIG. 5B may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database 564 in FIG. 5B is illustrated as being stored inside one or more memories 562 in the data collection platform 502, FIG. 5B contemplates that the database 564 may be stored in a standalone data store communicatively coupled to the data collection module 566 and processor 560 of the data collection platform 502 via the communications interface 568 of the data collection platform 502.

Data collection platform 502 may include or be in communication with one or more data historians. The data historian may be implemented as one or more software modules, one or more virtual machines, or one or more hardware elements (e.g., servers). The data historian may collect data at regular intervals (e.g., every minute, every two minutes, every ten minutes, every thirty minutes). The data historian may include or be in communication with an instance of remote data collection hardware and/or software, such as, for example, Honeywell Uniformance Scout Express. The remote data collection may be implemented as one or more software modules, one or more virtual machines, or one or more hardware elements (e.g., servers). In one or more embodiments, the Uniformance Scout Express may work with or in place of the data collection module and/or the data historian to handle one or more aspects of data replication.

In addition, the data collection module 566 may assist the processor 560 in the data collection platform 502 in communicating with, via the communications interface 568, and processing data received from other sources, such as data feeds from third-party servers and manual entry at the field site from a dashboard graphical user interface.

Referring to FIG. 5C, in one example, a data analysis platform 504 may comprise a processor 570, one or more memories 572, and communication interfaces 582. The memory 572 may comprise a database 574 for storing data records of various values collected from one or more sources. Alternatively, the database 574 may be the same database as that depicted in FIG. 5B and the data analysis platform 504 may communicatively couple with the database via the communication interface 582 of the data analysis platform 504. At least one advantage of sharing a database between the two platforms is the reduced memory requirements due to not duplicating the same or similar data.

The data analysis platform 504 may include a data service. In some embodiments, the data service may comprise computer-executable instructions that, when executed by the processor, cause the data analysis platform to perform one or more of the steps disclosed herein. In other embodiments, the data service may be a virtual machine. In some embodiments, the data service may be a hybrid of software-based and/or hardware-based instructions to perform one or more of the steps disclosed herein.

Also, the data analysis platform 504 may include a data historian. In some embodiments, the data historian may comprise computer-executable instructions that, when executed by the processor, cause the data analysis platform to perform one or more of the steps disclosed herein. In other embodiments, the data historian may be a virtual machine. In some embodiments, the data historian may be a hybrid of software-based and/or hardware-based instructions to perform one or more of the steps disclosed herein. The data historian may collect data at regular intervals (e.g., every minute, every two minutes, every ten minutes, every thirty minutes).

Additionally, the data analysis platform 504 may include a data lake. In some embodiments, the data lake may comprise computer-executable instructions that, when executed by the processor, cause the data analysis platform to perform one or more of the steps disclosed herein. In other embodiments, the data lake may be a virtual machine. In some embodiments, the data lake may be a hybrid of software-based and/or hardware-based instructions to perform one or more of the steps disclosed herein. The data lake may perform relational data storage. The data lake may provide data in a format that may be useful for processing data and/or performing data analytics.

Moreover, the data analysis platform 504 may include a calculations service. In some embodiments, the calculations service may comprise computer-executable instructions that, when executed by the processor, cause the data analysis platform to perform one or more of the steps disclosed herein. In other embodiments, the calculations service may be a virtual machine. In some embodiments, the calculations service may be a hybrid of software-based and/or hardware-based instructions to perform one or more of the steps disclosed herein. The calculations service may collect data, perform calculations, and/or provide key performance indicators. The calculations service may implement, for example, process dynamic modeling software or tools (e.g., UniSim).

Furthermore, the data analysis platform 504 may include a utility service. In some embodiments, the utility service may comprise computer-executable instructions that, when executed by the processor, cause the data analysis platform to perform one or more of the steps disclosed herein. In other embodiments, the utility service may be a virtual machine. In some embodiments, the utility service may be a hybrid of software-based and/or hardware-based instructions to perform one or more of the steps disclosed herein. The utility service may take information from the calculations service and put the information into the data lake. The utility service may provide data aggregation service, such as taking all data for a particular range, normalizing the data (e.g., determining an average), and combining the normalized data into a file to send to another system or module.

One or more components of the data analysis platform 504 may assist the processor in the data analysis platform in processing and analyzing the data values stored in the database. In some embodiments, the data analysis platform may perform statistical analysis, predictive analytics, and/or machine learning on the data values in the database to generate predictions and models. For example, the data analysis platform may analyze sensor data to monitor for, predict, and prevent determine temperature excursion in the equipment of a plant. The data analysis platform 504 may compare temperature data from different times and dates to determine if changes are occurring. Such comparisons may be made on a monthly, weekly, daily, hourly, real-time, or some other basis.

The analysis unit may be partially or fully automated. In one embodiment, the system is performed by a computer system, such as a third-party computer system, local to or remote from the plant and/or the plant planning center. The system may receive signals and parameters via the communication network, and display in real time related performance information on an interactive display device accessible to an operator or user. The platform allows two or more users to work with the same information, thereby creating a collaborative environment for sharing best practices or for troubleshooting. The method may provide accurate prediction and optimization results due to fully configured models.

Referring to FIG. 5C, the recommendation module 578 in the data analysis platform may coordinate with the data analysis module 576 to generate recommendations for adjusting one or more parameters for the operation of the plant environment depicted in FIG. 5A. In some embodiments, the recommendation module 578 may communicate the recommendation to the command module 580, which may generate command codes that may be transmitted, via the communications interface, to cause adjustments or halting/starting of one or more operations in the plant environment. The command codes may be transmitted to a control platform for processing and/or execution. In an alternative embodiment, the command codes may be directly communicated, either wirelessly or in a wired fashion, to physical components at the plant such that the physical components comprise an interface to receive the commands and execute on them.

Although the elements of FIG. 5C are illustrated as logical block diagrams, the disclosure is not so limited. In particular, one or more of the logical boxes in FIG. 5C may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database is visually depicted in FIG. 5C as being stored inside one or more memories in the data analysis platform, FIG. 5C contemplates that the database may be stored in a standalone data store communicatively coupled to the data analysis module 576 and processor of the data analysis platform via the communications interface of the data analysis platform. Furthermore, the databases from multiple plant locations may be shared and holistically analyzed to identify one or more trends and/or patterns in the operation and behavior of the plant and/or plant equipment. In such a crowdsourcing-type example, a distributed database arrangement may be provided where a logical database may simply serve as an interface through which multiple, separate databases may be accessed. As such, a computer with predictive analytic capabilities may access the logical database to analyze, recommend, and/or predict the behavior of one or more aspects of plants and/or equipment. In another example, the data values from a database from each plant may be combined and/or collated into a single database where predictive analytic engines may perform calculations and prediction models.

Referring to FIG. 5D, in one example, a control platform 506 may comprise a processor 584, one or more memories 586, and communication interfaces 592. The memory 586 may comprise a database 588 for storing data records of various values transmitted from a user interface, computing device, or other platform. The values may comprise parameter values for the process or the particular equipment at the plant. For example, some illustrative equipment at the plant that may be configured and/or controlled by the control platform 506 may include, but is not limited to, one or more valves, one or more pumps, and/or one or more automatic control loop. In addition, a control module 590 may be stored in the memory 586 and assist the processor 584 in the control platform 506 in receiving, storing, and transmitting the data values stored in the database 588. In some embodiments, the control module 590 may comprise computer-executable instructions that, when executed by the processor 584, cause the control platform 506 to perform one or more of the steps disclosed herein. In other embodiments, the control module 590 may be a hybrid of software-based and/or hardware-based instructions to perform one or more of the steps disclosed herein.

In a plant environment such as illustrated in FIG. 5A, if sensor data is outside of a safe range, this may be cause for immediate danger. As such, there may be a real-time component to the system such that the system processes and responds in a timely manner. Numerous embodiments contemplate a real-time or near real-time responsiveness in analyzing and generating alerts, such as those generated or received by the alert module in FIG. 5E.

Referring to FIG. 5E, in one example, a remote device 518 may comprise a processor 593, one or more memories 594, and communication interfaces 599. The memory 594 may comprise a database 595 for storing data records of various values entered by a user or received through the communications interface 599. In addition, an alert module 596, command module 597, and/or dashboard module 598 may be stored in the memory 594 and assist the processor 593 in the remote device 518 in processing and analyzing the data values stored in the database 595. In some embodiments, the aforementioned modules may comprise computer-executable instructions that, when executed by the processor, cause the remote device to perform one or more of the steps disclosed herein. In other embodiments, the aforementioned modules may be a hybrid of software-based and/or hardware-based instructions to perform one or more of the steps disclosed herein. In some embodiments, the aforementioned modules may generate or receive alerts 596 based on values received through the communications interface. The values may indicate a dangerous condition or even merely a warning condition due to odd sensor readings. The command module 597 in the remote device 518 may generate a command that, when transmitted through the communications interface to the platforms at the plant, causes adjusting of one or more parameter operations of the plant environment depicted in FIG. 5A. In some embodiments, the dashboard module 598 may display a graphical user interface to a user of the remote device to enable the user to enter desired parameters and/or commands. These parameters/commands may be transmitted to the command module to generate the appropriate resulting command codes that may be then transmitted, via the communications interface, to cause adjustments or halting/starting of one or more operations in the plant environment. The command codes may be transmitted to a control platform for processing and/or execution. In an alternative embodiment, the command codes may be directly communicated, either wirelessly or in a wired fashion, to physical components at the plant such that the physical components comprise an interface to receive the commands and execute them.

Although FIG. 5E is not so limited, in some embodiments the remote device 518 may comprise a desktop computer, a smartphone, a wireless device, a tablet computer, a laptop computer, and/or the like. The remote device 518 may be physically located locally or remotely, and may be connected by one of communications links to the public network that is linked via a communications link to the private network. The network used to connect the remote device 518 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links may be any communications links suitable for communicating between workstations and server, such as network links, dial-up links, wireless links, hard-wired links, as well as network types developed in the future, and the like. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

Although the elements of FIG. 5E are illustrated as logical block diagrams, the disclosure is not so limited. In particular, one or more of the logical boxes in FIG. 5E may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database is visually depicted in FIG. 5E as being stored inside one or more memories in the remote device, FIG. 5E contemplates that the database may be stored in a standalone data store communicatively coupled, via the communications interface, to the modules stored at the remote device and processor of the remote device.

Figure 6A:
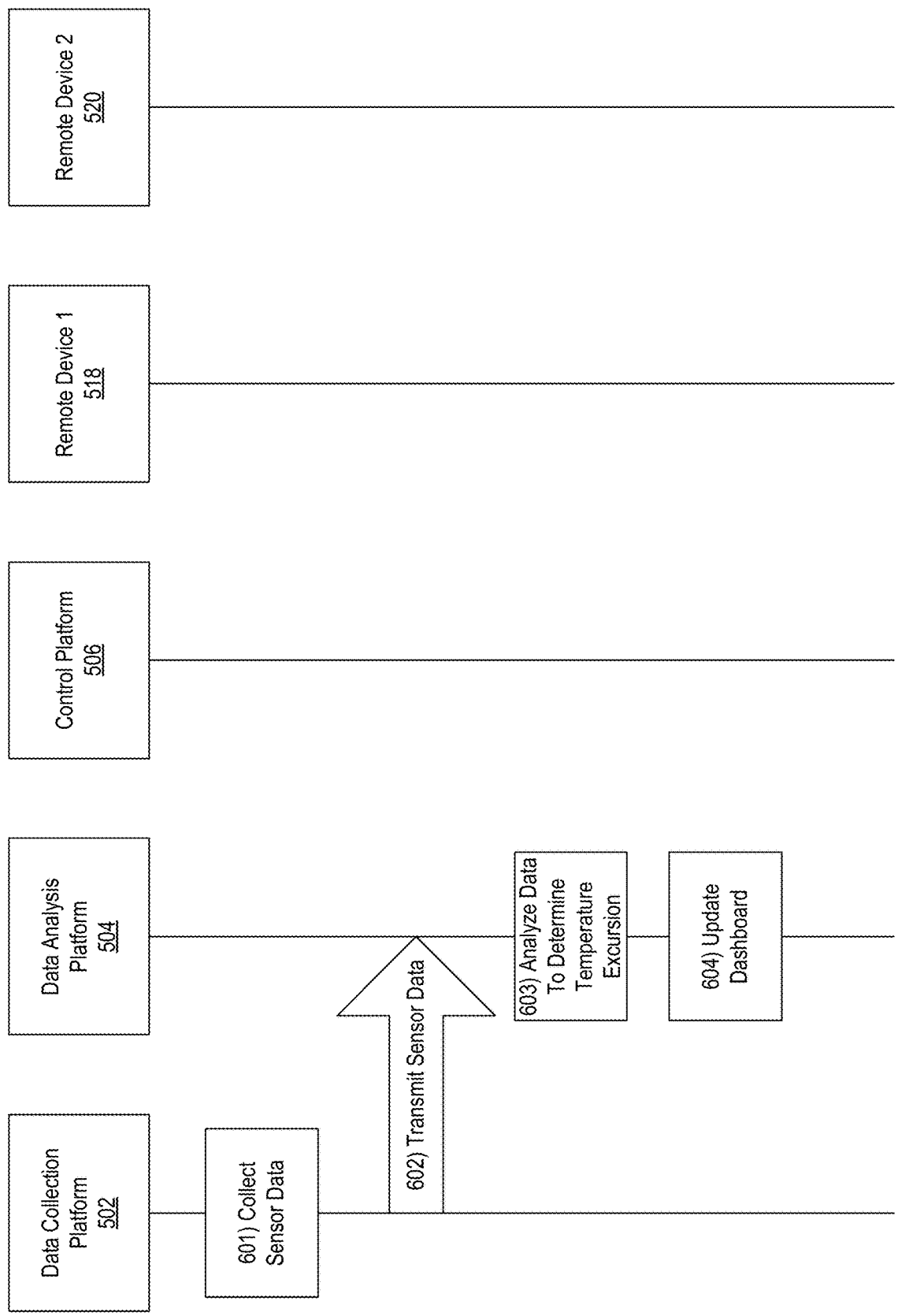
FIGS. 6A and 6B depict an illustrative flow diagram of one or more steps that one or more devices may perform in controlling one or more aspects of a plant operation in accordance with one or more example embodiments.
Figure 6B:
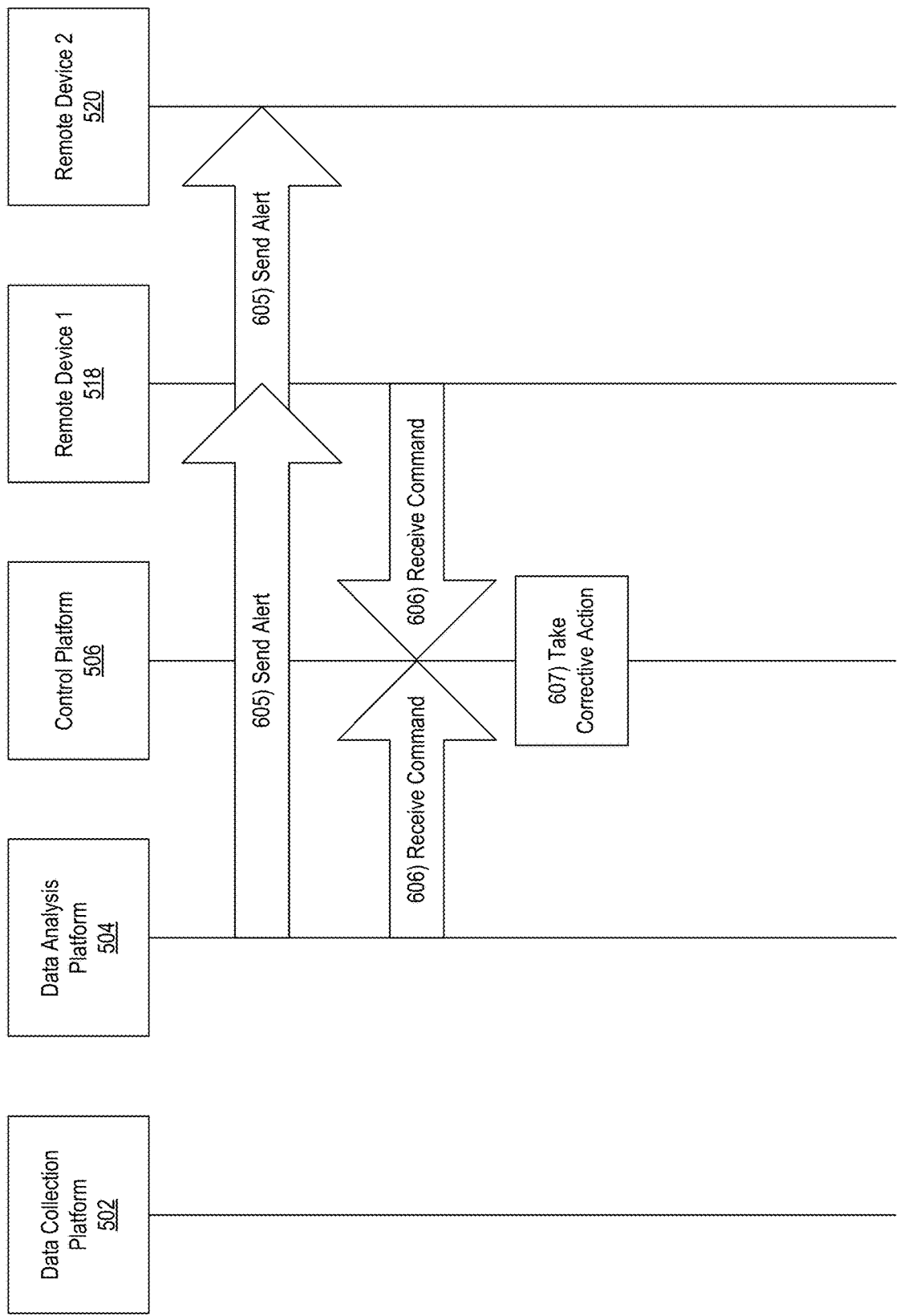

FIGS. 6A-6B depict illustrative system flow diagrams in accordance with one or more embodiments described herein. As shown in FIG. 6A, in step 601, data collection platform may collect sensor data (e.g., related to a heater). In step 602, data collection platform may transmit sensor data to data analysis platform. In step 603, data analysis platform may analyze data. For example, data analysis platform may determine whether a temperature excursion is occurring or likely to occur. In step 604, data analysis platform may update one or more dashboards—such as, for example, a dashboard (e.g., dashboard 512) in communication with data analysis platform (e.g., data analysis platform 504) or a dashboard (e.g., dashboard 510) in communication with a client portal (e.g., client portal 508).

As shown in FIG. 6B, in step 605, data analysis platform may send an alert, such as to remote device 1 and/or remote device 2. In step 606, the control platform may receive a command, such as from remote device 1, remote device 2, and/or data analysis platform. In some embodiments, the data analysis platform may receive the command from remote device 1 and/or remote device 2. In some embodiments, the data analysis platform may use the analyzed data to determine the command to send to the control platform. In some embodiments, data analysis platform may perform additional analysis based on additional data and/or the received command from remote device 1 and/or remote device 2 before sending a command to control platform. In step 607, the control platform may cause an adjustment to an operating parameter. The adjustment to the operating parameter may be based on the command received from data analysis platform, remote device 1, and/or remote device 2. The adjustment to the operating parameter may be related to one or more pieces of equipment (e.g., one or more reactor units, heaters, or the like, experiencing a temperature excursion or exhibiting warning signs of a potential temperature excursion) associated with sensors that collected the sensor data in step 601. For example, a flow rate may be increased or decreased, a pressure may be increased or decreased, a feed rate may be increased or decreased, a valve may be opened or closed, a process may be started, stopped, extended, or shortened, or the like.

Dashboard of Stability Gauge

Figure 7:
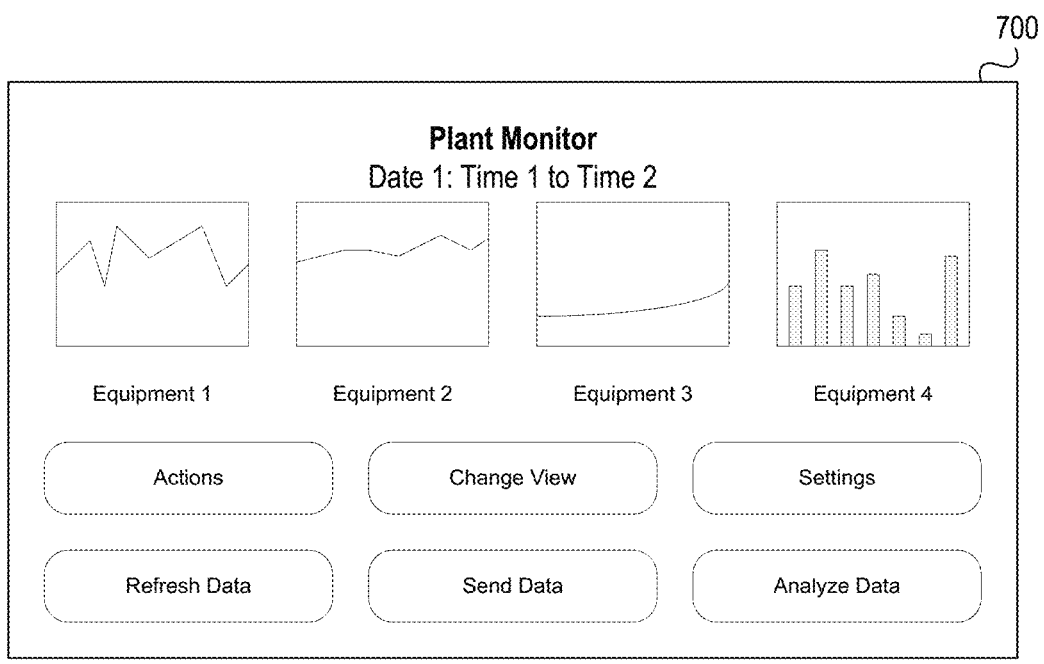
FIGS. 7 and 8 depict illustrative graphical user interfaces related to one or more aspects of a plant operation in accordance with one or more example embodiments.

FIG. 7 depicts an illustrative graphical user interface 700 of an application that may be used for providing information received from one or more sensors or determined based on analyzing information received from one or more sensors, according to one or more embodiments described herein. The graphical user interface may be displayed on the Human Machine Interface of the Distributed Control System or Programmable Logic Controller or as part of a smartphone application (e.g., running on a remote device, such as remote device 1 or remote device 2), a desktop application, a web application (e.g., that runs in a web browser), a web site, an application running on a plant computer, or the like.

The graphical user interface 700 may include one or more visual representations of data (e.g., chart, graph, etc.) that shows information about a plant, a particular piece of equipment (e.g., one or more reactor units) in a plant, or a process performed by a plant or a particular piece or combination of equipment in the plant. For example, a graph may show information about an operating condition, an efficiency, a production level, or the like. The graphical user interface may include a description of the equipment, the combination of equipment, or the plant to which the visual display of information pertains.

The graphical user interface 700 may display the information for a particular time or period of time (e.g., the last five minutes, the last ten minutes, the last hour, the last two hours, the last 12 hours, the last 24 hours, etc.). The graphical user interface may be adjustable to show different ranges of time, automatically or based on user input.

The graphical user interface 700 may include one or more buttons that allow one or more actions. For example, the graphical user interface may include a button (e.g., an "Actions" button) that, when pressed, shows one or more available actions. The graphical user interface may include a button (e.g., a "Change View" button) that, when pressed, changes one or more views of one or more elements of the graphical user interface. The graphical user interface may include a button (e.g., a "Settings" button) that, when pressed, shows one or more settings of the application of which the graphical user interface is a part. The graphical user interface may include a button (e.g., a "Refresh Data" button) that, when pressed, refreshes data displayed by the graphical user interface. In some aspects, data displayed by the graphical user interface may be refreshed in real time, according to a preset schedule (e.g., every five seconds, every ten seconds, every minute, etc.), and/or in response to a received refresh request. The graphical user interface may include a button (e.g., a "Send Data" button) that, when pressed, allows sending data to one or more other devices. For example, the data may be sent via email, SMS, text message, iMessage, FTP, cloud sharing, AirDrop, or via some other method. The interface may receive a selection of one or more pieces of data, graphics, charts, graphs, elements of the display, or the like, to share or send. The graphical user interface may include a button (e.g., an "Analyze Data" button) that, when pressed, causes one or more data analysis functions to be performed. In some aspects, the interface may receive additional input about the desired data analysis, such as desired input, desired output, desired granularity, desired time to complete the data analysis, desired time of input data, or the like.

Detecting and Preventing Temperature Excursion

Aspects of the disclosure are directed to a system that predicts, detects, and/or adjusts process conditions before a temperature excursion can occur forcing a shutdown of the process unit. Referring to FIG. 10, the system may consist of a multi-stage approach, such as a three-stage approach, to mitigate a potential temperature excursion. The three stages can be used together, or individually. The first stage may include an advisory stability monitor (e.g., Stability Gauge 1002), based on a weighted algorithm, to alert and advise when the unit is moving away from a stable state and is becoming more susceptible to a temperature runaway. The second and/or third stage may be part of a customized Temperature Excursion Mitigation Control System. Excursion Mitigation Level 1 1004 may return operation to safe parameters with minimal or no loss of production. Temperature Excursion Mitigation Level 2 1006, may include a larger response to place the unit into a safe state and prevent depressuring the unit. The goal of the three-stage approach is to avoid activation of the Emergency Shutdown 1008 system, which leads to depressuring of the unit to flare. The three stages can be used together, or individually, to monitor process conditions, advising of the risk of a temperature excursion when conditions are indicative of the beginning stages, and to automate the response to the situation, thus limiting the progression and severity of the excursion.

The advisory stability monitor (e.g., Stability Gauge 1002) functions with process indicators to determine the stability of the process unit. The advisory stability monitor uses a weighted algorithm to determine the stability of the unit (weighted based on how much operations deviate from a stable state and how quickly the rate of change is occurring).

The advisory stability monitor (e.g., Stability Gauge 1002) may provide a stability gauge 404 to allow an instant assessment of the process conditions and the risk of a temperature excursion. The stability gauge may be weighted in value from 0 to 100 with predefined regions, for example, from 0 to 33 may be the green, stable area, 33 to 66 may be the yellow, concern area and 66 to 99 may be the red, danger area. As operating conditions change, the stability gauge may change to indicate whether there are any issues or areas of concern. The advisory stability monitor may provide a continuous assessment of risk, and may indicate whether the risk is decreasing or still increasing when operations parameters are changed. The stability monitor may also provide one or more options to trend and graph certain variables used in the algorithm, as shown in FIG. 7. These trends can aid in monitoring the unit and help to identify the variables that are causing the instability to aid in determining whether the variables are increasing or decreasing in instability over a period of time.

The advisory stability monitor may use an algorithm based on operating conditions (variables) in the plant including, for example, Feed flowrate (F); Makeup Gas Consumption (M); Quench flowrate (Q1, Q2, Q3, etc.); Quench Capacity (C); Pressure (P); Reactive Feed Ratio (A); Recycle Gas Purity (H); Recycle Gas flowrate (R); Gas to oil ratio (G); Axial Temperature (X1, X2, X3, X4 etc.); Radial Temperature (D1, D2, D3, D4, etc.); WABT (W1, W2 etc.); Reactor Bed Temperatures (T); Reactor Bed Inlet Temperatures (I); Light Ends Make (L); Conversion (S).

Exemplary positions of process indicators are shown in FIG. 1 and numbered 1-17 enclosed in boxes:
1. Feed to the Unit (flowrate)
2. Makeup Gas consumption (flowrate)
3. Quench flowrate
4. Quench flowrate
5. Quench flowrate
6. Quench flowrate
7. Quench flowrate
8. Quench flowrate
9. Quench flowrate
10. Separator Pressure
11. Feed type (ratio of cracked feed to VGO) (determined by flowrate)
12. Recycle Gas Purity—hydrogen analyzer
13. Recycle Gas Flowrate
14. Second stage Feed (flowrate)
15. Second stage Recycle Gas Flowrate
16. Reactor temperatures—not shown—reactors may have many temperature indicators—referred to as bed temperatures
17. Hydrogen to hydrocarbon ratio is a calculation of hydrogen purity*Recycle gas rate divided by the feed rate. E.G., Items [12*(13+3+4+5+6+7)]/1

In order to properly monitor the reactions as the reactants pass through the catalyst bed, it is not sufficient to just measure the temperature of the flowing stream at the inlet and outlet of the reactor. It is necessary to observe the temperature at the inlet, outlet, and radially throughout the catalyst bed. A bed thermocouple measures the temperature at one point in a large cross-sectional area. The reactors may be equipped with many bed thermocouples at regular intervals in the reactors in order to monitor the reactions. The exact location and distance between bed thermocouples will depend upon the depth and diameter of the catalyst bed. FIG. 3 depicts an illustrative cross section of an example vertical reactor. Thermocouples 310 may be placed in different positions on the horizontal plane, as indicated. As depicted in FIG. 2, thermocouples may be placed at various heights along the catalyst beds. A temperature profile plot may be used to evaluate performance of catalyst, effectiveness of quench, and reactor flow patterns. A temperature profile can be constructed by plotting the catalyst temperature versus distance into the catalyst bed (or more accurately versus weight percent of catalyst).

There will be a maximum temperature at which the catalyst and reactors can safely operate. This maximum temperature depends on the type of catalyst system employed. The maximum allowable operating temperature will also be determined by the metallurgical limit of the reactors and should never be exceeded.

FIG. 4 depicts an illustrative example flowchart that, in one or more embodiments, may include one or more depicted steps for operation of an advisory stability monitor (e.g., Stability Gauge 410), in conjunction with the Temperature Excursion Mitigation Control System and the Depressuring Emergency Interlock Shutdown System. Some embodiments may include every step, omit certain steps, repeat certain steps, or include additional steps.

An advisory stability monitor (e.g., Stability Gauge 410) may constantly and/or periodically receive and assess one or more process indicators 420. Normal operating conditions may be indicated 402. Block 410 advises that the reactor temperature has increased from normal and into a cautionary state and action should be taken per established procedures. For example, a stability gauge (e.g., stability gauge 800, stability gauge 1002) may provide a first level of messaging to encourage operator action to resolve an issue. In one or more embodiments, the stability gauge might not work based on temperature threshold values, but rather may trend away from historical average (stable states).

The advisory stability monitor (e.g., Stability Gauge 410) continues to monitor and assess the process indicators. As the reactor temperatures rise, the stability monitor may alert to take appropriate action before the automated sequences disrupt production. If the reactor temperatures continue to rise and reach a preset temperature Level 1 trip point, then the Temperature Excursion Mitigation Control System may advise that Temperature Excursion Level 1 (block 412) has been reached and automatic actions are being taken. Such actions may include one or more of the following: remove/reduce more reactive feedstock; increase less reactive feed; lower charge heater outlet temperature; and lower the controlled temperature in the reactor bed with an elevated temperature and in the following reactor bed. The objective of Level 1 is to attempt to return operations to safe parameters with minimal or no loss of production.

The advisory stability monitor (e.g., Stability Gauge 410) continues to monitor and assess the process indicators. As the reactor temperatures rise, the stability monitor may alert to take appropriate action before the automated sequences disrupt production. If the reactor temperatures reach a preset temperature Level 2 trip point, then the Temperature Excursion Mitigation Control System may advise that Temperature Excursion Level 2 (block 414) has been reached and automatic actions are being taken. This phase places the unit in a safe state, reducing temperatures and pressures, to allow for an easy and expedient restart of the unit. Such actions may include one or more of the following: ramp the charge heater outlet temperature down to a lower temperature (e.g., 300° F., 400° F., 500° F., 600° F., or the like); ramp the combined feed exchanger outlet temperature down to a lower temperature (e.g., 300° F., 400° F., 500° F., 600° F., or the like); ramp all reactor bed temperatures down to a lower temperature (e.g., 300° F., 400° F., 500° F., 600° F., or the like); reduce a pressure of the unit by a particular percentage (e.g., 5%, 6%, 7%, 8%, 9%, 10%, or the like) of operating pressure. The objective of Level 2 may be to attempt to prevent a depressuring event that may result in extended downtime of the unit as well as associated refinery units, a loss in production, potential damage to the reactors, reactor internals, catalyst beds and the reactor effluent air coolers and environmental flaring of hydrocarbons and sulfur compounds. Another objective of Level 2 may be to place the unit in a safe state that will also allow for an easy and expedient restart of the unit.

If the reactor temperatures reach the temperature shutdown trip point, then the Emergency Interlock Shutdown (block 416) System may take automatic actions. Such actions may include high rate depressure of the reactor and/or a complete shutdown of the process unit. The Emergency Interlock Shutdown System may already be part of typical design and will remain as the fail safe action to protect the equipment, environment, and prevent loss of life.

In the various steps, temperature runaways (excursions) can be avoided by
1) Not exceeding average temperature rise (average outlet temperature-average inlet temperature) or maximum temperature rise (maximum bed temperature-minimum bed temperature) across any one catalyst bed as designed for the reactor and type of catalyst;
2) When making changes in feed rate, increasing feed rate first, then increasing catalyst temperature; or decreasing catalyst temperature first, then decreasing feed rate;
3) Making catalyst temperature increases gradually and smoothly (depends on age of the catalyst and severity of the operation); 4) If any upsets in flows are observed (loss of liquid recycle, for example), immediately reducing reactor inlet temperatures.

Figure 8:
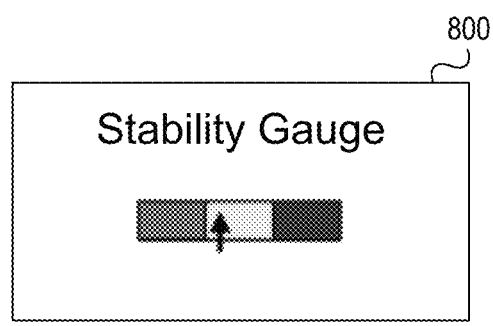

The examples described herein, including the examples in the preceding paragraph, may be implemented in a graphical user interface, such as illustrated in FIG. 7 and FIG. 8, through underlying automated rules. For example, when a plant may be changing the feed rate, if an attempt is made to reduce the feed rate before decreasing the catalyst temperature, the advisory stability monitor (e.g., Stability Gauge 410, Stability Gauge 1002) may trend toward caution and danger and the system may suggest to decrease the catalyst temperature first before reducing the feed rate in response to entry of the command to reduce the feed rate. Such an embodiment may be implemented through software and/or hardware that serves as an interface to the controls that adjust the various variables and parameters of a reactor unit and/or plant. Other examples include enforcement of a desired sequence of events before a particular requested action may be executed. In another example, the rate at which an inputted change may occur may be regulated and monitored in a closed feedback loop by the computerized system. In some examples, the inputted command may be entered by a human operator, but in other instances the command may be automatically generated or input from a local or remote system.

In some aspects, if the advisory stability monitor (e.g., Stability Gauge 410, Stability Gauge 1002) determines one or more conditions that may indicate a problem, an alarm (e.g., a visual and/or audible alarm) may be triggered. The alarm could be an alarm at a plant, an alarm that is sent to one or more devices, an alarm that shows on a web page or dashboard, or the like.

In some aspects, if a problem is detected, the control platform may take one or more actions, which may be triggered, requested, or recommended by data analysis platform. Alternatively or additionally, the data analysis platform may trigger an alert to one or more remote devices (e.g., remote device 1, remote device 2). The alert may include information about the problem. The alert may provide information about one or more determined correlations between the problem and a particular operating condition or combination of operating conditions. The alert may include one or more recommendations for and/or commands causing adjustments to operating conditions, such as adjustments to flows, pressures, temperatures, valves, nozzles, drains, or the like.

In some aspects, a remote device may send a command for a particular action (e.g., a corrective action) to be taken, which may or may not be based on the alert. In some aspects, the data analysis platform may send a command for a particular action to be taken, whether or not an alert was sent to or a command was sent by the remote device. The command may cause one or more actions to be taken, which may prevent equipment (e.g., reactor) damage, avoid failure, or the like.

Stability Monitor Algorithm

An algorithm for weighting the changes in the process variables to determine the stability of the unit is described below. This is a simplified version to exemplify how and why variables may be used to measure the stability of the unit in order to provide a gauge. The plant process variables used in the algorithm may include, but are not limited to, for example, Feed flowrate (F); Makeup Gas Consumption (M); Quench flowrate (Q1, Q2, Q3, etc.); Quench Capacity (C); Pressure (P); Reactive Feed Ratio (A); Recycle Gas Purity (H); Recycle Gas flowrate (R); Gas to oil ratio (G); Axial Temperature (X1, X2, X3, X4 etc.); Radial Temperature (D1, D2, D3, D4, etc.); WABT (W1, W2 etc.); Reactor Bed Temperatures (T); Reactor Bed Inlet Temperatures (I); Light Ends Make (L); Conversion (S).

$$\text{Stability} = \{[(\Delta F - B_{feed})^* K_{feed}] - [(\Delta I_{crackingx} - B_{crackingIx})^* K_{crackingIx}]\} + [(\Delta M - B_{makeup})^* K_{makeup}] + [(\Delta Q - B_{quench})^* K_{quench}]^* K_{quench}] + [C^* K_{qcapacity}] + [(\Delta P - B_{pressure})^* K_{pressure}] + [(\Delta A - B_{reactratio})^* K_{reactratio}] + U^* K_u + [(\Delta H_{increase} - B_{hpurityincrease})^* K_{hpurityincrease}] + [(\Delta H_{decrease} - B_{hpuritydecrease})^* K_{hpuritydecrease}] + [(\Delta R - B_{recycle})^* K_{recycle}] + J^* K_J + [(\Delta G - B_{GOratio})^* K_{GOratio}] + [(\Delta T - B_{tempx})^* K_{temp}] + Z^* K_z + Y K_Y + [(\Delta W_x - B_{WABTx})^* K_{WABTx}]\} + [(\Delta L - B_{Lightends})^* K_{Lightends}] + [(\Delta S - B_{conversion})^* K_{Conversion}]$$

Gain (K) Constants and % Biases (B)

All the variables will have Gain (K) constants and % Biases (B) so the system may be tuned and/or weighting adjusted. Initial numbers generally will be based on design recommendations (e.g., Feed change of more than 2%, 3%, 4,%, 5%, 6%, 10%, 15%, etc.; Quench increase by more than 5%, 7%, 10%, 12%, 15%, 20%, 25%, etc.; Cracked feedstock ratio increase by X %), which can be adjusted to avoid nuisance alarms and customize to each unique unit.

Factors in the Equation, i.e. $[(\Delta X - B_X)^* K_X]$

In certain aspects, if the factors in the equation, i.e. $[(\Delta X - B_X)^* K_X]$, are negative, then those factors will go to zero and the system will not take credit in the stability measurement for variables moving to a safer state, unless defined. Only variables moving towards instability will be included in the stability measurement.

Examples of Various Stability Algorithms

A method for weighting the changes in the process variables and defining the stability of the unit is described below in a simplified version of the algorithm that exemplifies how and why variables will be used to measure the stability of the unit in order to provide a gauge.

(F) Feed Flowrate Decreased

Decreases to the feed rate may be preceded by a change in reactor temperatures such that temperatures are lowered before feed rate is changed. An equation for the change in feed rate may be: $\Delta F = \{[(F_{60min} - F_{actual})) / F_{60min}]^* 100\}$ if $\Delta F$ is >B % then the unit stability, unless the reactor bed inlet temperatures in the cracking beds, variable I, have also decreased, may increase in trending toward caution or danger. So an algorithm for decreasing the feed rate may be:

$\Delta F$ is the % change in the feed rate, scaled from 0 to 100

$\Delta I_{cracking}$ is the reactor bed inlet temperatures, scaled from 0 to 100

$$\Delta F = \{[(F_{60min} - F_{actual})) / F_{60min}]^* 100\}$$

$$\Delta I_{crackingx} = \{[(I_{cracking60minx} - I_{crackingactualx}) / I_{cracking60minx}]^* 100\} - (\text{include one for each cracking bed})$$

$$\text{Stability} = \{[(\Delta F - B_{feed})^* K_{feed}] - [(\Delta I_{crackingx} - B_{crackingIx})^* K_{crackingIx}]\} + \text{other variables explained below}$$

$\Delta F$ may be indicated on a summary display and may be graphed and trended on the variable display that may assist in assessing which variable is leading to instability and whether the change in that variable is increasing or decreasing over the hourly average.

Another factor may be used to measure instability due to increases in feed rate. The algorithm for determining and weighting feed rate increases will be similar to the algorithm above.

(M) Makeup Gas Consumption Increase

Changes in Makeup Gas Rate indicate that more makeup gas is being consumed and reactions may be increasing. The stability factor for Makeup Gas consumption may be calculated based on a change in makeup gas rate over a period of time, $\Delta M = \{[(M_{actual} - M_{60min}) / M_{60min}]^* 100\}$, such that if $\Delta M$ is $> B_{makeup}\%$, then the stability gauge will increase in trending toward caution or danger.

$\Delta M$ is the % change in the Makeup Gas Rate, scaled from 0 to 100

$$\Delta M = \{[(M_{actual} - M_{60min}) / M_{60min}]^* 100\}$$

$$\text{Stability} = \{[(\Delta F - B_{feed})^* K_{feed}] - [(\Delta I_{crackingx} - B_{crackingIx})^* K_{crackingIx}]\} + [(\Delta M - B_{makeup})^* K_{makeup}] + \text{other variables explained below}$$

$\Delta M$ may be indicated on a summary display and may be graphed and trended on the variable display that may assist in assessing which variable is leading to instability and whether the change in that variable is increasing or decreasing over the hourly average.

Another factor may be used to measure instability due to a decrease in Makeup Gas Rate. The algorithm for determining and weighting Makeup Gas Rate decreases will be similar to the algorithm above.

(Q) Quench Rates Increase

Increases in the Quench Gas Rate indicate that there is a higher temperature rise in the bed above and reactions in that bed may be increasing. The stability factor for Quench Gas Rates may be calculated based on a change in Quench Gas Rate for each reactor bed over a period of time, $\Delta Q = \{[(Q_{actual} - Q_{60min}) / Q_{60min}]^* 100\}$, such that if $\Delta Q$ is $> B_{quench}\%$, then the stability gauge will increase in trending toward caution or danger. As any of the several catalyst beds may become independently unstable, the stability gauge may weight the instability by using only the quench with the largest increase.

$\Delta Q$ is the % change in Quench Gas Flow Rate, scaled from 0 to 100

Each reactor bed will have its own $\Delta Qn$ ($\Delta Q1, \Delta Q2, \ldots \Delta Qn$)

$$\Delta Q1 = \{[(Q1_{actual} - Q1_{60min}) / Q1_{60min}]^* 100\},$$

$$\Delta Q = \text{Maximum}(\Delta Q1, \Delta Q2, \ldots \Delta Qn)$$

$$\text{Stability} = \{[(\Delta F - B_{feed})^* K_{feed}] - [(\Delta I_{crackingx} - B_{crackingIx})^* K_{crackingIx}]\} + [(\Delta M - B_{makeup})^* K_{makeup}] + [(\Delta Q - B_{quench})^* K_{quench}] + \text{other variables explained below}$$

Quench Rate increases ($\Delta Q$) may be indicated on a summary display and may be graphed and trended on the variable display that may assist in assessing which variable is leading to instability and whether the change in that variable is increasing or decreasing over the hourly average. A further display may graph and trend all the various $\Delta Q1, \Delta Q2, \ldots \Delta Qn$ such that the specific catalyst beds with higher instability can be identified.

(C) Quench Capacity

It is important to monitor the quench control valve opening to determine the reserve quench available, in case of an upset. In some embodiments, the valve may be open all the way. Alternatively, in some embodiments, the valve may be open less than all the way (e.g., 95%, 90%, 85%, 80%, 75%, 70%, 65%, 60%, 55%, 50%, 45%, 40%, 35%, 30%, 25%, 20%, 15%, 10%, 5%, 1%). In one or more embodiments, a quench valve position may be determined from a quench valve position sensor, which may read and send a position of a particular quench valve of a reactor. In one or more embodiments, a quench valve might not have a quench valve position sensor. Even if a quench valve does not have a quench valve position sensor, the quench valve might be set by sending a command indicating a position that the quench valve should be set to. A quench valve position may be determined from the command sent to the quench valve. Quench capacity may be defined as the available valve opening remaining, such that if the valve opening is at a first percentage, the available remaining capacity is a second percentage (e.g., 100%—first percentage). Thus, for example, if the valve opening is at 75%, then the available remaining capacity is 25%. Similarly, if the valve opening is at 65%, then the available remaining capacity is 35%. If the valve opening is at 45%, then the available remaining capacity is 55%. Decreasing Quench Capacity indicates that there is a higher temperature rise in the bed above and reactions in that bed may be increasing. The stability factor for Quench capacity may be calculated based on a percent of quench control valve opening. Different benchmarks (e.g., normal operation, caution, danger) may be set. For example, if the quench control valve opening moves above 50%, the stability gauge may indicate caution, and if the quench control valve opening moves above 65%, the stability gauge may indicate danger. In another embodiment, if the quench control valve opening moves above 60%, the stability gauge may indicate caution, and if the quench control valve opening moves above 75%, the stability gauge may indicate danger. In another embodiment, if the quench control valve opening moves above 30%, the stability gauge may indicate caution, and if the quench control valve opening moves above 50%, the stability gauge may indicate danger. The stability gauge may weight the instability by using only the valve with the least capacity.

$V_{opening}$ is the quench valve percent open $V_{qvalve}$ is the expected nominal valve position and will be customized based on the installed quench valve trim Each reactor bed will have its own Cn and Vn factors Cn is scaled from 0 to 100

$$V1_{percent} = (V1_{opening} - V1_{qvalve}) V1_{qvalve}$$

$$C1 = V1_{percent} * 66.66/(1 - V1_{qvalve}) + 33.33$$

If $V1_{percent}$ is negative, then $C1=0$ $$C = Maximum(C1, C2, \ldots Cn)$$

$$\text{Stability} = \{[(\Delta F - B_{feed})*K_{feed}] - [(\Delta I_{crackingx} - B_{crackingIx})*K_{crackingIx}]\} + [(\Delta M - B_{makeup})*K_{makeup}] + [(\Delta Q - B_{quench})*K_{quench}] + [C*K_{qcapacity}] + \text{other variables explained below}$$

Quench Capacity (C) may be indicated on a summary display and may be graphed and trended on the variable display that may assist in assessing which variable is leading to instability and whether the change in that variable is increasing or decreasing over the hourly average. A further display may graph and trend all the various C1, C2, . . . Cn such that the specific valves with least capacity can be identified.

(P) Pressure Decreases

Decreases in pressure indicate that more makeup gas is being consumed than can be replenished to maintain pressure in the unit. This is an indication that reactions may be increasing. The stability factor for Pressure decreasing may be calculated based on a change in pressure over a period of time. So the equation for the change in pressure may be as follows: $\Delta P = \{[(P_{60min} - P_{actual})/P_{60min}] * 100\}$ if $\Delta P$ is $>B_{pressure}$ % then the unit stability may increase in trending toward caution or danger:

$\Delta P$ is the % change in operating pressure scaled from 0 to 100

$$\Delta P = \{[(P_{60min} - P_{actual})/P_{60min}] * 100\}$$

$$\text{Stability} = \{[(\Delta F - B_{feed})*K_{feed}] - [(\Delta I_{crackingx} - B_{crackingIx})*K_{crackingIx}]\} + [(\Delta M - B_{makeup})*K_{makeup}] + [(\Delta Q - B_{quench})*K_{quench}] + [C*K_{qcapacity}] + [(\Delta P - B_{pressure})*K_{pressure}] + \text{other variables explained below}$$

Pressure decreases ($\Delta P$) may be indicated on a summary display and may be graphed and trended on the variable display that may assist in assessing which variable is leading to instability and whether the change in that variable is increasing or decreasing over the hourly average.

Other factors may be calculated to measure instability due to an increase in pressure, as an increment in the hydrogen partial pressure in the unit will change reaction rates. The algorithm for determining and weighting pressure increases will be similar to the algorithm above.

(A) Ratio of Reactive Feed Increases

Increases to the Reactive Feed Ratio indicate that reactions in the beds may be increasing. The stability factor for the Reactive Feed Ratio may be calculated based on a change in the ratio over a period of time, $\Delta A = \{[(A_{actual} - A_{60min})/A_{60min}] * 100\}$, such that if $\Delta A$ is $>B_{reactratio}$%, then the stability gauge will increase in trending toward caution and danger. Also, included in the algorithm is a parameter, U, which considers the unit design Reactive Feed Ratio. As the operating Reactive Feed Ratio nears the design ratio, the stability gauge will increase in trending toward danger.

$\Delta A$ is the % change in Reactive Feed Ratio, scaled from 0 to 100

$$\Delta A = \{[(A_{actual} - A_{60min})/A_{60min}] * 100\},$$

$A_{design}$ = the design reactive feed ratio - $B_{designreactratio}$

If $A_{design}$ is negative then it goes to 0

$$U = \{[(A_{actual} - A_{design})/A_{design}] * 100\} + 65$$

If $(A_{actual} - A_{design})$ is negative, then $U=0$ $$\text{Stability} = \{[(\Delta F - B_{feed})*K_{feed}] - [(\Delta I_{crackingx} - B_{crackingIx})*K_{crackingIx}]\} + [(\Delta M - B_{makeup})*K_{makeup}] + [(\Delta Q - B_{quench})*K_{quench}] + [C*K_{qcapacity}] + [(\Delta P - B_{pressure})*K_{pressure}] + [(\Delta A - B_{reactratio})*K_{reactratio}] + U*K_u + \text{other variables explained below}$$

Reactive Feed Ratio ($\Delta A$) and Design Reactive Feed Ratio (U) may be indicated on a summary display and may be graphed and trended on the variable display that may assist in assessing which variable is leading to instability and whether the change in that variable is increasing or decreasing over the hourly average.

(H) Recycle Gas Purity

Increases or decreases in Recycle Gas Purity indicates that the unit may be moving into areas of instability. Decreases in Recycle Gas Purity indicates that reactions in the beds may be increasing and more light ends are being produced. Increasing Recycle Gas Purity increases the partial pressure of the unit and may result in changes to the conversion or increased hydrotreating reactions. The stability factor for Recycle Gas Purity may be calculated based on a change in purity over a period of time, $\Delta H = \{[(H_{60min} - H_{actual})/H_{60min}] * 100\}$, such that if $\Delta H$ is $>B_{hpurity}$%, then stability gauge will increase in trending toward caution and danger.

$\Delta H_{increase}$ is the % change in Recycle Gas Purity, scaled from 0 to 100

$$\Delta H_{increase} = \{[(H_{actual} - H_{60min})/H_{60min}] * 100\},$$

$\Delta H_{decrease}$ is the % change in Recycle Gas Purity, scaled from 0 to 100

$$\Delta H_{decrease} = \{[(H_{60min} - H_{actual})/H_{60min}]*100\},$$

Stability=$\{[(\Delta F - B_{feed})*K_{feed}] - [(\Delta I_{crackingx} - B_{crackingIx})*K_{crackingIx}]\} + [(\Delta M - B_{makeup})*K_{makeup}] + [(\Delta Q - B_{quench})*K_{quench}] + [C*K_{gcapacity}] + [(\Delta P - B_{pressure})*K_{pressure}] + [(\Delta A - B_{reactratio})*K_{reactratio}] + U*K_u + [(\Delta H_{increase} - B_{hpurityincrease})*K_{hpurityincrease}] + [(\Delta H_{decrease} - B_{hpuritydecrease})*K_{hpuritydecrease}] +$ other variables explained below Recycle Gas Purity $\Delta H_{increase}$ and $\Delta H_{decrease}$ may be indicated on a summary display and may be graphed and trended on the variable display that may assist in assessing which variable is leading to instability and whether the change in that variable is increasing or decreasing over the hourly average.

(R) Recycle Gas Rate

A decrease in Recycle Gas rate can cause instability. The stability factor for the Recycle Gas rate may be calculated based on a change in flow over a period of time, $\Delta R = \{[(R_{60min} - R_{actual})/R_{60min}]*100\}$, such that if $\Delta R$ is $>B_{recycle}\%$, then the stability gauge will increase in trending toward caution. Also, included in the algorithm is a parameter, J, which considers the unit design Recycle Gas rate. As the operating Recycle Gas rate nears the design rate, the stability gauge will increase in trending toward danger.

$\Delta R$ is the % change in Recycle Gas rate, scaled from 0 to 100

$$\Delta R = \{[(R_{60min} - R_{actual})/R_{60min}]*100\},$$

$R_{design}$=the design Recycle Gas rate (unique to each unit)

$$J = [((((0.75*R_{design}) - R_{actual})/R_{design})*100) + 65]$$

If $((0.75*R_{design}) - R_{actual})$ is negative, then J=0

Stability=$\{[(\Delta F - B_{feed})*K_{feed}] - [(\Delta I_{crackingx} - B_{crackingIx})*K_{crackingIx}]\} + [(\Delta M - B_{makeup})*K_{makeup}] + [(\Delta Q - B_{quench})*K_{quench}] + [C*K_{gcapacity}] + [(\Delta P - B_{pressure})*K_{pressure}] + [(\Delta A - B_{reactratio})*K_{reactratio}] + U*K_u + [(\Delta H_{increase} - B_{hpurityincrease})*K_{hpurityincrease}] + [(\Delta H_{decrease} - B_{hpuritydecrease})*K_{hpuritydecrease}] + [(\Delta R - B_{recycle})*K_{recycle}] + J*K_J +$ other variables explained below Recycle Gas rate ($\Delta R$) and Design Recycle Gas rate (J) may be indicated on a summary display and may be graphed and trended on the variable display that may assist in assessing which variable is leading to instability and whether the change in that variable is increasing or decreasing over the hourly average.

(G) Gas to Oil Ratio

A decrease in Gas to Oil Ratio can indicate instability. The stability factor for Gas to Oil Ratio may be calculated based on a change in the ratio over a period of time, $\Delta G = \{[(G_{60min} - G_{actual})/G_{60min}]*100\}$, such that if $\Delta G$ is $>B_{GOratio}\%$, then stability gauge will increase in trending toward caution and danger.

$\Delta G$ is the % change in Gas to Oil Ratio, scaled from 0 to 100

$$\Delta G = \{[(G_{60min} - G_{actual})/G_{60min}]*100\},$$

$G_{design}$=the design Gas to Oil Ratio (unique to each unit)–$B_{designgasoilratio}$ $$E = \{[(G_{design} - G_{actual})/G_{design}]*100\} + 65$$

If $(G_{actual} - G_{design})$ is negative, then E=0

Stability=$\{[*\Delta F - B_{feed})*K_{feed}] - [(\Delta I_{crackingx} - B_{crackingIx})*K_{crackingIx}]\} + [(\Delta M - B_{makeup})*K_{makeup}] + [(\Delta Q - B_{quench})*K_{quench}] + [C*K_{gcapacity}] + [(\Delta P - B_{pressure})*K_{pressure}] + [(\Delta A - B_{reactratio})*K_{reactratio}] + U*K_u + [(\Delta H_{increase} - B_{hpurityincrease})*K_{hpurityincrease}] + [(\Delta H_{decrease} - B_{hpuritydecrease})*K_{hpuritydecrease}] + [(\Delta R - B_{recycle})*K_{recycle}] + J*K_J + [(\Delta G - B_{GOratio})*K_{GOratio}] + E*K_E +$ other variables explained below Gas to Oil Ratio ($\Delta G$) may be indicated on a summary display and may be graphed and trended on the variable display that may assist in assessing which variable is leading to instability and whether the change in that variable is increasing or decreasing over the hourly average.

(T) Reactor Bed Temperatures

Increases to the Reactor Bed Temperatures indicate that reactions in the beds may be increasing. The stability factor for Reactor Bed Temperatures may be calculated based on a change in temperature over a period of time, $\Delta T = \{(T_{actual} - T_{60min})\}$, such that if $\Delta T$ is $>B_{temps}$, then the stability gauge will increase in trending toward caution and danger. $B_{tempsx}$, may be a unique, adjustable bias for each reactor bed, so hydrotreating and cracking beds can be tuned and customized as required. The stability gauge may weight the instability by using only the temperature with the largest increase.

$\Delta T$ is the change in temperature, scaled from 0 to 100

Each reactor bed thermocouple will have its own $\Delta Tn$ $$\Delta T1 = (T1_{actual} - T1_{60min}),$$

$$\Delta T = \text{Maximum}(\Delta T1, \Delta T2, \ldots \Delta Tn)$$

Stability=$\{[(\Delta F - B_{feed})*K_{feed}] - [(\Delta I_{crackingx} - B_{crackingIx})*K_{crackingIx}]\} + [(\Delta M - B_{makeup})*K_{makeup}] + [(\Delta Q - B_{quench})*K_{quench}] + [C*K_{gcapacity}] + [(\Delta P - B_{pressure})*K_{pressure}] + [(\Delta A - B_{reactratio})*K_{reactratio}] + U*K_u + [(\Delta H_{increase} - B_{hpurityincrease})*K_{hpurityincrease}] + [(\Delta H_{decrease} - B_{hpuritydecrease})*K_{hpuritydecrease}] + [(\Delta R - B_{recycle})*K_{recycle}] + J*K_J + [(\Delta G - B_{GOratio})*K_{GOratio}] + E*K_E + [(\Delta T - B_{tempx})*K_{temp}] +$ other variables explained below Reactor Bed Temperatures may be indicated on a summary display and may be graphed and trended on the variable display that may assist in assessing which variable is leading to instability and whether the change in that variable is increasing or decreasing over the hourly average.

(X) Axial Bed Temperatures Increasing

Increases to the Axial Reactor Bed Temperatures indicate that reactions in the beds may be increasing. The stability factor for Axial Reactor Bed Temperatures may be calculated based on the recommended average and Maximum Bed Temperature Rise, $\Delta X = (X_{outlet} - X_{inlet})$, such that if $\Delta X$ is $>B_{average\_xtemps}$, then stability gauge will start to increase in trending toward yellow, caution, and if $\Delta X$ is $>B_{maximum\_xtemps}$, then the stability gauge will start to increase in trending toward red, danger. The stability gauge may weight the instability by using only the axial bed with the largest increase.

$\Delta X$ is the Axial Reactor Bed Temperature, scaled from 0 to 100

Each reactor bed will have its own $\Delta Xn$ and Zn $$\Delta Xn = (Xn_{outlet} - Xn_{inlet}),$$

$Bn_{average\_xtemps}$=based on Process Control Guidelines for catalyst type $Bn_{maximum\_xtemps}$=based on Process Control Guidelines for catalyst type $$Zn_{average} = \{[(\Delta Xn - Bn_{average\_xtemps})*K_{average\_xtemps}] + 33\}$$

If $(\Delta Xn - Bn_{average\_xtemps})$, is negative, the term $Zn_{average}$ goes to 0

$Zn_{maximum} = \{[(\Delta Xn - Bn_{maximum\_xtemps})^* K_{maximum\_xtemps}] + 66\}$ If $(\Delta Xn - Bn_{maximum\_xtemps})$ is negative, the term $Zn_{maximum}$ goes to 0

$Z = \text{Maximum}(Z1_{average} + Z1_{maximum}, Z2_{average} + Z2_{maximum}, Zn_{average} + Zn_{maximum})$ Stability = $\{[(\Delta F - B_{feed})^* K_{feed}] - [(\Delta I_{crackingx} - B_{crackingIx})^* K_{crackingIx}]\} + [(\Delta M - B_{makeup})^* K_{makeup}] + [(\Delta Q - B_{quench})^* K_{quench}] + [C^* K_{qcapacity}] + [(\Delta P - B_{pressure})^* K_{pressure}] + [(\Delta A - B_{reactratio})^* K_{reactratio}] + U^* K_u + [(\Delta H_{increase} - B_{hpurityincrease})^* K_{hpurityincrease}] + [(\Delta H_{decrease} - B_{hpuritydecrease})^* K_{hpuritydecrease}] + [(\Delta R - B_{recycle})^* K_{recycle}] + J^* K_J + [(\Delta G - B_{GOratio})^* K_{GOratio}] + E^* K_E + [(\Delta T - B_{tempx})^* K_{temp}] + Z^* K_z +$ other variables explained below The axial bed temperature and/or the average of the axial bed temperatures in a bed may be indicated on a summary display and may be graphed and trended on the variable display that may assist in assessing which variable is leading to instability and whether the change in that variable is increasing or decreasing over the hourly average. A further display may graph and trend all the various Z1, Z2, . . . Zn such that the axial bed rises with the largest increase can be identified.

(D) Radial Bed Temperatures Increasing

Increases to the Radial Reactor Bed Temperatures, D, indicate that reactions in the beds may be increasing. The stability factor for Radial Reactor Bed Temperatures may be calculated based on the recommended Radial Temperatures Spread, $\Delta D = (D_{highest} - D_{lowest})$, such that if $\Delta D$ is $>B_{radialspread}$, then stability gauge will start to increase in trending toward caution and then toward danger. The stability gauge may weight the instability by using only the radial bed with the largest increase.

$\Delta D$ is the Radial Reactor Bed Temperature, scaled from 0 to 100

Each reactor bed will have its own $\Delta Dn$ $\Delta Dn = (Dn_{highest} - Dn_{lowest})$ $(\Delta Dn - Bn_{radialspread})$ cannot be negative $Bn_{radialspread}$ = based on Process Control Guidelines for catalyst type $Y = \text{Maximum}[\Delta D1 - B1_{radialspread}), (\Delta D2 - B2_{radialspread}), \ldots (\Delta Dn - Bn_{radialspread})]^* K_{radialspread}$ Stability = $\{[(\Delta F - B_{feed})^* K_{feed}] - [(\Delta I_{crackingx} - B_{crackingIx})^* K_{crackingIx}]\} + [(\Delta M - B_{makeup})^* K_{makeup}] + [(\Delta Q - B_{quench})^* K_{quench}] + [C^* K_{qcapacity}] + [(\Delta P - B_{pressure})^* K_{pressure}] + [(\Delta A - B_{reactratio})^* K_{reactratio}] + U^* K_u + [(\Delta H_{increase} - B_{hpurityincrease})^* K_{hpurityincrease}] + [(\Delta H_{decrease} - B_{hpuritydecrease})^* K_{hpuritydecrease}] + [(\Delta R - B_{recycle})^* K_{recycle}] + J^* K_J + [(\Delta G - B_{GOratio})^* K_{GOratio}] + E^* K_E + [(\Delta T - B_{tempx})^* K_{temp}] + Z^* K_z + Y^* K_Y +$ other variables explained below D and/or Y may be indicated on a summary display and may be graphed and trended on the variable display that may assist in assessing which variable is leading to instability and whether the change in that variable is increasing or decreasing over the hourly average. A further display may graph and trend all the various $\Delta D1, \Delta D2, \ldots \Delta Dn$ such that the axial bed rises with the largest increase can be identified.

(W) Weighted Average Bed Temperature (WABT)

The WABT is measurement of the weighted average bed temperatures and will be used to indicate instability in individual reactor beds. The equation for the change in WABT may be as follows: $\Delta W = \{[(W_{actual} - W_{60min})/W_{60min}]^* 100\}$ if $\Delta W_{WABTx}$ is $>B$%, then the unit stability may increase in trending toward caution or danger. The algorithm for increasing the WABT may be:

$\Delta W$ is the % change in WABT, scaled from 0 to 100

Each reactor bed will have its own $\Delta W$ $\Delta W = \{[(W_{actual} - W_{60min})/W_{60min}]^* 100\}$ Stability = $\{[(\Delta F - B_{feed})^* K_{feed}] - [(\Delta I_{crackingx} - B_{crackingIx})^* K_{crackingIx}]\} + [(\Delta M - B_{makeup})^* K_{makeup}] + [(\Delta Q - B_{quench})^* K_{quench}] + [C^* K_{qcapacity}] + [(\Delta P - B_{pressure})^* K_{pressure}] + [(\Delta A - B_{reactratio})^* K_{reactratio}] + U^* K_u + [(\Delta H_{increase} - B_{hpurityincrease})^* K_{hpurityincrease}] + [(\Delta H_{decrease} - B_{hpuritydecrease})^* K_{hpuritydecrease}] + [(\Delta R - B_{recycle})^* K_{recycle}] + J^* K_J + [(\Delta G - B_{GOratio})^* K_{GOratio}] + [(\Delta T - B_{tempx})^* K_{temp}] + Z^* K_z + YK_Y + [(\Delta W_x - B_{WABTx})^* K_{WABTx}]\} +$ other variables explained below $\Delta W$ may be indicated on a summary display and may be graphed and trended on the variable display that may assist in assessing which variable is leading to instability and whether the change in that variable is increasing or decreasing over the hourly average.

(L) Light Ends Make Increases

Changes in Light Ends Make (L) is visible in the Separator off gas flow rate, the Stripper Off gas flow rate and the Receiver Liquid level and Receiver Liquid flow rate. Increasing Light Ends Make indicates that reactions may be increasing, conversion is higher and temperatures may be increasing. The stability factor for Light Ends Make may be calculated based on a change in Light Ends Make over a period of time, $\Delta L = \{[(L_{actual} - L_{60min})/L_{60min}]^* 100\}$, such that if $\Delta L$ is $>B_{Lightends}$%, then the stability gauge will increase in trending toward caution or danger.

$\Delta L$ is the % change in Light Ends Make, scaled from 0 to 100

$\Delta L = \{[(L_{actual} - L_{60min})/L_{60min}]^* 100\}$

Stability = $\{[(\Delta F - B_{feed})^* K_{feed}] - [(\Delta I_{crackingx} - B_{crackingIx})^* K_{crackingIx}]\} + [(\Delta M - B_{makeup})^* K_{makeup}] + [(\Delta Q - B_{quench})^* K_{quench}] + [C^* K_{qcapacity}] + [(\Delta P - B_{pressure})^* K_{pressure}] + [(\Delta A - B_{reactratio})^* K_{reactratio}] + U^* K_u + [(\Delta H_{increase} - B_{hpurityincrease})^* K_{hpurityincrease}] + [(\Delta H_{decrease} - B_{hpuritydecrease})^* K_{hpuritydecrease}] + [(\Delta R - B_{recycle})^* K_{recycle}] + J^* K_J + [(\Delta G - B_{GOratio})^* K_{GOratio}] + [(\Delta T - B_{tempx})^* K_{temp}] + Z^* K_z + YK_Y + [(\Delta W_x - B_{WABTx})^* K_{WABTx}]\} + [(\Delta L - B_{Lightends})^* K_{Lightends}] +$ other variables explained below Light Ends Make ($\Delta L$) may be indicated on a summary display and may be graphed and trended on the variable display that may assist in assessing which variable is leading to instability and whether the change in that variable is increasing or decreasing over the hourly average.

(S) Conversion Increases

Increasing conversion (S) is visible in a decreasing Product Fractionator Bottoms Level or the Product Fractionator Bottoms flow rate, depending on the flow scheme. Increasing conversion is a lagging indicator that increasing instability. The stability factor for conversion may be calculated based on a change in conversion over a period of time, $\Delta S = \{[(S_{60min} - S_{actual})/S_{60min}]^* 100\}$, such that if $\Delta S$ is $>B_{conversion}$%, then the stability gauge will increase in trending toward caution or danger.

$\Delta S$ is the % change in Conversion, scaled from 0 to 100

$\Delta S = \{[(S_{60min} - S_{actual})/S_{60min}]^* 100\}$,

Stability = $\{[(\Delta F - B_{feed})^* K_{feed}] - [(\Delta I_{crackingx} - B_{crackingIx})^* K_{crackingIx}]\} + [(\Delta M -$ $B_{makeup})*K_{makeup}]+[(\Delta Q-B_{quench})*K_{quench}]+$
$[C*K_{qcapacity}]+[(\Delta P-B_{pressure})*K_{pressure}]+[(\Delta A-$
$B_{reactratio})*K_{reactratio}]+U*K_u+[(\Delta H_{increase}-$
$B_{hpurityincrease})*K_{hpurityincrease}]+[(\Delta H_{decrease}-$
$B_{hpuritydecrease})*K_{hpuritydecrease}]+[(\Delta R-$
$B_{recycle})*K_{recycle}]+J*K_J+[(\Delta G-B_{GOratio})*$
$K_{GOratio}]+[(\Delta T-B_{tempx})*K_{temp}]+Z*K_z+YK_Y+$
$[(\Delta W_x-B_{WABTx})*K_{WABTx}]\}+[(\Delta L-$
$B_{Lightends})*K_{Lightends}]+[(\Delta S-B_{conversion})*$
$K_{Conversion}]$ Conversion Increase ($\Delta S$) may also be graphed and trended on the variable display that may assist in assessing which variable is leading to instability and whether the change in that variable is increasing or decreasing over the hourly average.

Individual Reactor Bed Stability Gauge

Individual bed stability may be calculated, trended and indicated. The variables applicable to each reactor bed stability gauge include:

Quench flowrate (to bed below) Q1, Q2, Q3, etc.
Quench Capacity (to bed below) C1, C2, C3 etc.
Axial temperature rise X1, X2, X3, X4, etc.
Radial Temperature D1, D2, D3, D4, etc.
Temperatures T1, T2, . . . TnTn
Reactor Bed Inlet Temperatures I1, I2, I3, I4, etc.

The individual bed stability gauge may use the same equations as defined above for each parameter but may combine only the factors listed above that are applicable to each bed. The individual bed stability gauge may be based on an algorithm to weight each individual bed temperature, as well as the axial and radial temperature rise, and combine those factors with weighted amounts for the quench flowrate and available quench capacity for the bed. The individual bed stability gauge may be graphed and trended on the variable display. The display may depict one or more individual bed stabilities, and/or whether the stability of each individual bed is increasing or decreasing over the hourly average.

Illustrative Embodiments of a Stability Gauge Interface

FIG. 8 depicts an illustrative graphical user interface of a stability gauge of a dashboard display that may display information received from one or more sensors or determined based on analyzing information received from one or more sensors, according to one or more embodiments described herein. One or more examples of stability algorithms described herein may form the underlying calculations for effecting the display of a stability gauge and/or resulting automated actions on the plant and/or equipment (e.g., reactor unit).

For example, building off the examples provided above, the stability gauge may display an indication of a green zone when, inter alia, the reactor bed temperature is within the desired limits. But if the reactor bed temperature (denoted as T) measurements increase, this may be an indication that the reactions in the beds may be increasing. T may be calculated based on a change in temperature over a period of time, $\Delta T=\{(T_{actual}-T_{60min})\}$, such that if $\Delta T$ is $>B_{temps}$, then the stability gauge will increase in trending toward caution and danger. When this occurs, the visual indication on the stability gauge may transition from a green zone to an amber/yellow zone, or from an amber/yellow zone to a red zone. Notably, $B_{tempsx}$, may be a unique, adjustable bias for each reactor unit/bed, and as such, may be tuned and customized as desired. Examples of illustrative stability algorithm with appropriate weighting and factors are described herein.

Moreover, the stability gauge may consider other temperature measurements in its final display of an indication zone. For example, measurements of one or more of an axial bed temperature (X) and radial bed temperature (D) may be used in adjusting the stability gauge indicator from one zone to another zone, or in micro-adjusting the stability gauge indicator within the same zone. In the case of axial bed temperature changes in measurement, the Z variable may be indicated on a summary display and may be graphed on the variable display that may assist in assessing which variable is leading to instability and whether the change in that variable is increasing or decreasing over the hourly average. In the case of radial bed temperature changes in measurement, the Y variable may be indicated on a summary display and may be graphed on the variable display that may assist in assessing which variable is leading to instability and whether the change in that variable is increasing or decreasing over the hourly average. In the case of a weighted average bed temperature change, $\Delta W$ may be indicated on a summary display and may be graphed on the variable display that may assist in assessing which variable is leading to instability and whether the change in that variable is increasing or decreasing over the hourly average. In each instance, the stability gauge illustrated in FIG. 8 may adjust its indicator along the spectrum of zones.

The stability gauge may monitor process conditions indicative of the beginning stages of a temperature excursion and automate a response to the situation, thus limiting the progression and severity of the excursion. In particular, in some examples, when the indicator of the stability gauge is outside of the green zone, the Temperature Excursion Mitigation System may take automated actions to alleviate possible excursions. Some examples of automatic actions/response that may be taken, include, but are not limited to one or more of the following: remove or reduce reactive feedstock; increase less reactive feed; lower temperature in the charge heater; and/or lower temperature in the reactor bed in alarm and the following bed. To implement these automated responses, the plant may be equipped with the numerous wired and wireless communication and control capabilities described herein. For example, the flow rate of various feeds may be increased or decreased through automated valve controls that open and/or close based on commands sent from a control platform illustrated in FIG. 5A. The commands may be generated based on analysis being performed by the data analysis platform and/or data collection platform, as illustrated in FIG. 5A. A command module, as illustrated in FIG. 5C, may collate the sequence of bytes appropriate to control components of the reactor unit, for example, to alleviate possible excursions.

Sensor Systems—Detection and Analysis

Sensor information may be gathered by one or more sensors and transmitted to data collection platform. Data collection platform may transmit the collected sensor data to data analysis platform, which may be at a plant or remote from a plant (e.g., in the cloud).

One or more calculations may be performed for reactor unit remote monitoring service. These calculations may assist in alerting and helping diagnose the status of one or more reactor units and/or other components used in a plant. A data processing platform may receive (e.g., from one or more sensors) one or more operational parameters, which may be used alone or in combination for determining the efficiency of the reactor unit. The data processing platform may use one or more design parameters, alone or in combination, for determining the status of the reactor unit. A design parameter may be a level at which the reactor unit was designed to operate at, below, or above. For example, a reactor unit may be designed to operate within a particular temperature range (e.g., the operating temperature should never exceed a metallurgical limit of the reactor).

In some instances, the timestamp of a calculated attribute may match the timestamp of the raw data used for the calculation. In some instances, a calculated attribute may use one or more results of one or more other calculated attributes; therefore, the order in which the attributes are calculated may be relevant. Meanwhile, in some embodiments, raw values may be checked for bad values. If bad values are detected, the data processing platform may either skip calculation or replace the bad value with NULL, as appropriate for subsequent calculations. For averages, a provision may be made to skip bad/null values and/or timestamps. Moreover, some units of measurement for variables may be specified. Some variables may be dimensionless, and therefore might not have a defined unit of measurement.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps illustrated in the illustrative figures may be performed in other than the recited order, and one or more depicted steps may be optional in accordance with aspects of the disclosure.

What is claimed is:

1. A system for preventing temperature excursion in a reactor, the system comprising: a reactor;
   a heater;
   a catalyst bed;
   a sensor configured to measure data associated with the catalyst bed;
   an analysis platform comprising:
   one or more processors; and
   memory storing executable instructions that, when executed, cause the analysis platform to:
      receive the data associated with the catalyst bed; store the data associated with the catalyst bed; analyze the data associated with the catalyst bed;
      determine, based on analyzing the data associated with the catalyst bed, whether a temperature of the reactor is trending away from a historical average temperature of the reactor;
      send a message to a control system associated with the reactor, the message configured to cause an action to reduce the temperature of the reactor;
      determine, based on analyzing the data associated with the catalyst bed, whether the temperature of the reactor is above a first point;
      based on determining that the temperature of the reactor is above the first point, send a first message to cause a first action to reduce the temperature of the reactor;
      determine, based on analyzing the data associated with the catalyst bed, whether the temperature of the reactor is above a second point different from the first point; and
      based on determining that the temperature of the reactor is above the first point and that the first action was taken for a first time for a period of time, or based on determining that a rate of change of the temperature of the reactor is above a threshold rate of change, send a second message to cause a repeat of the first action to reduce the temperature of the reactor.

2. The system of claim 1, wherein the reactor is an exothermic reactor.

3. The system of claim 1, wherein the reactor is a hydrocracker.

4. The system of claim 1, wherein the reactor is a hydrotreater.

5. The system of claim 1, wherein the sensor configured to measure the data associated with the catalyst bed is a temperature sensor configured to measure a temperature of the catalyst bed at one or more of an inlet of the catalyst bed, a middle of the catalyst bed, or an outlet of the catalyst bed.

6. The system of claim 1, wherein the executable instructions, when executed, cause the analysis platform to:
   based on determining that the temperature of the reactor is above the first point, send a message to cause one or more of removing a reactive feed stock, maintaining a constant feed rate, or reducing an outlet temperature of the heater.

7. The system of claim 1, wherein the executable instructions, when executed, cause the analysis platform to:
   based on determining that the temperature of the reactor is above the first point, and that one or more temperature controllers for a catalyst bed where a temperature deviation was detected are not available, send a message to cause an action to reduce a temperature of a catalyst bed directly above the catalyst bed where the temperature deviation was detected.

8. The system of claim 1, wherein the executable instructions, when executed, cause the analysis platform to:
   based on determining that the temperature of the reactor is above the second point, send a message to cause a second action to reduce the temperature of the reactor.

9. The system of claim 8, wherein the executable instructions, when executed, cause the analysis platform to:
   based on determining that the temperature of the reactor is above the second point, send a message to cause one or more of ramping a temperature of the heater down to a predetermined temperature, ramping an inlet temperature for all the catalyst beds, bypassing a combined feed exchanger, or reducing an operating pressure of a unit comprising the reactor.

10. The system of claim 1, wherein the executable instructions, when executed, cause the analysis platform to:
    send an alert message to a remote device, the alert message indicating that the temperature of the reactor is above a threshold.

11. The system of claim 1, wherein the executable instructions, when executed, cause the analysis platform to:
    determine one or more of a feed flow rate, a makeup gas consumption flow rate, a quench flow rate, a separator pressure, a feed type, a recycle gas purity, a second stage feed flow rate, a second stage recycle gas flow rate, or a hydrogen to hydrocarbon ratio; and
    adjust the display of the stability gauge based on the one or more of the feed flow rate, the makeup gas consumption flow rate, the quench flow rate, the separator pressure, the feed type, the recycle gas purity, the second stage feed flow rate, the second stage recycle gas flow rate, or the hydrogen to hydrocarbon ratio.

12. The system of claim 1, wherein the executable instructions, when executed, cause the analysis platform to:
    adjust the display of the stability gauge that indicates the risk level that the reactor experiences the temperature excursion to display a normal risk level, an approaching risk level, or an at-risk risk level.

13. The system of claim 1, wherein the executable instructions, when executed, cause the analysis platform to:
    based on determining that the temperature of the reactor is trending away from the historical average temperature of the reactor, adjust a display of a stability gauge that indicates a risk level that the reactor experiences a temperature excursion.

14. A system for preventing temperature excursion in a reactor, the system comprising: a reactor;
a heater;
a catalyst bed;
a sensor configured to measure data associated with the catalyst bed;
an analysis platform comprising:
one or more processors; and
memory storing executable instructions that, when executed, cause the analysis platform to:
receive the data associated with the catalyst bed; store the data associated with the catalyst bed; analyze the data associated with the catalyst bed;
determine, based on analyzing the data associated with the catalyst bed, whether a temperature of the reactor is trending away from a historical average temperature of the reactor;
send a message to a control system associated with the reactor, the message configured to cause an action to reduce the temperature of the reactor;
determine, based on analyzing the data associated with the catalyst bed, whether the temperature of the reactor is above a first point;
based on determining that the temperature of the reactor is above the first point, send a message to cause a first action to reduce the temperature of the reactor;
determine, based on analyzing the data associated with the catalyst bed, whether the temperature of the reactor is above a second point different from the first point; and
based on determining that the temperature of the reactor is above the second point, send a message to cause a second action to reduce the temperature of the reactor.

15. The system of claim 14, wherein the executable instructions, when executed, cause the analysis platform to:
based on determining that the temperature of the reactor is above the second point, send a message to cause one or more of ramping a temperature of the heater down to a predetermined temperature, ramping an inlet temperature for all the catalyst beds, bypassing a combined feed exchanger, or reducing an operating pressure of a unit comprising the reactor.

16. A system for preventing temperature excursion in a reactor, the system comprising: a reactor;
a heater;
a catalyst bed;
a sensor configured to measure data associated with the catalyst bed;
an analysis platform comprising:
one or more processors; and
memory storing executable instructions that, when executed, cause the analysis platform to:
receive the data associated with the catalyst bed; store the data associated with the catalyst bed; analyze the data associated with the catalyst bed;
determine, based on analyzing the data associated with the catalyst bed, whether a temperature of the reactor is trending away from a historical average temperature of the reactor;
send a message to a control system associated with the reactor, the message configured to cause an action to reduce the temperature of the reactor;
determine, based on analyzing the data associated with the catalyst bed, whether the temperature of the reactor is above a first point; and,
based on determining that the temperature of the reactor is above the first point, and that one or more temperature controllers for a catalyst bed where a temperature deviation was detected are not available, send a message to cause an action to reduce a temperature of a catalyst bed directly above the catalyst bed where the temperature deviation was detected.

* * * * *